United States Patent
Xue et al.

(10) Patent No.: US 12,022,435 B2
(45) Date of Patent: Jun. 25, 2024

(54) RADIO (NR) SIDELINK (SL) CHANNEL ACCESS USING VIRTUAL COLLISION METRIC

(71) Applicant: QUALCOMM INCORPORATED, San Diego, CA (US)

(72) Inventors: Yisheng Xue, San Diego, CA (US); Jing Sun, San Diego, CA (US); Xiaoxia Zhang, San Diego, CA (US); Peter Gaal, San Diego, CA (US); Juan Montojo, San Diego, CA (US); Ozcan Ozturk, San Diego, CA (US); Sony Akkarakaran, Poway, CA (US); Chih-Hao Liu, San Diego, CA (US); Piyush Gupta, Bridgewater, NJ (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 17/247,066

(22) Filed: Nov. 25, 2020

(65) Prior Publication Data

US 2022/0167311 A1    May 26, 2022

(51) Int. Cl.
*H04W 72/02* (2009.01)
*H04W 28/02* (2009.01)
*H04W 72/21* (2023.01)
*H04W 72/51* (2023.01)
*H04W 72/542* (2023.01)

(52) U.S. Cl.
CPC ....... *H04W 72/02* (2013.01); *H04W 28/0215* (2013.01); *H04W 72/21* (2023.01); *H04W 72/51* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 2020/0008030 A1* | 1/2020 | Kim | H04W 72/23 |
| 2020/0045674 A1* | 2/2020 | Tseng | H04W 76/14 |
| 2021/0289380 A1* | 9/2021 | Chae | H04W 72/54 |
| 2022/0095280 A1* | 3/2022 | Farag | H04W 72/20 |

(Continued)

FOREIGN PATENT DOCUMENTS

| | | |
|---|---|---|
| EP | 3550905 A1 | 10/2019 |
| WO | 2020033088 A1 | 2/2020 |
| WO | 2020033422 A1 | 2/2020 |

OTHER PUBLICATIONS

International Search Report and Written Opinion—PCT/US2021/056525—ISA/EPO—Feb. 16, 2022.

*Primary Examiner* — Mohammad S Adhami
(74) *Attorney, Agent, or Firm* — QUALCOMM Incorporated

(57) ABSTRACT

Wireless communications systems and methods related to channel congestion estimations based on virtual collision metrics are provided. A user equipment (UE) may select a plurality of resources from a sidelink resource pool. The UE may request an evaluation of an availability of the plurality of resources and may receive an indication of the availability of the plurality of resources. The UE may further transmit, based on a virtual collision metric associated with the indication of the availability of the plurality of resources, a first sidelink transmission.

30 Claims, 14 Drawing Sheets

(56) References Cited

U.S. PATENT DOCUMENTS

2023/0082194 A1\* 3/2023 Liu ...................... H04W 76/28
2023/0189325 A1\* 6/2023 Su ........................ H04W 72/25
370/329

\* cited by examiner

RADIO (NR) SIDELINK (SL) CHANNEL ACCESS USING VIRTUAL COLLISION METRIC

TECHNICAL FIELD

This application relates to wireless communication systems, and more particularly to sidelink channel access using virtual collision metrics.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) includes selecting a plurality of resources from a sidelink resource pool. The method may further include requesting an evaluation of an availability of the plurality of resources and receiving an indication of the availability of the plurality of resources. Further, the method may include transmitting, based on a virtual collision metric associated with the indication of the availability of the plurality of resources, a first sidelink transmission.

In an additional aspect of the disclosure, a method of wireless communication performed by a user equipment (UE), the method includes performing measurement-only sensing in a sidelink resource pool. The performing the measurement-only sensing can include selecting a plurality of measurement-only resources from the sidelink resource pool and obtaining an availability of the plurality of measurement-only resources. The method may further include transmitting, based on a virtual collision metric associated with the availability of the plurality of measurement-only resources obtained from the measurement-only sensing, a first sidelink transmission.

In an additional aspect of the disclosure, a user equipment (UE) includes a processor configured to select a plurality of resources from a sidelink resource pool. The processor may be further configured to request an evaluation of an availability of the plurality of resources and to receive an indication of the availability of the plurality of resources. The UE may further include a transceiver in communication with the processor and configured to transmit, based on a virtual collision metric associated with the indication of the availability of the plurality of resources, a first sidelink transmission.

In an additional aspect of the disclosure, a user equipment (UE) includes a processor configured to perform measurement-only sensing in a sidelink resource pool. The processor configured to perform the measurement-only sensing may be further configured to select a plurality of measurement-only resources from the sidelink resource pool and to obtain an availability of the plurality of measurement-only resources. The UE may further include a transceiver in communication with the processor and configured to transmit, based on a virtual collision metric associated with the availability of the plurality of measurement-only resources obtained from the measurement-only sensing, a first sidelink transmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
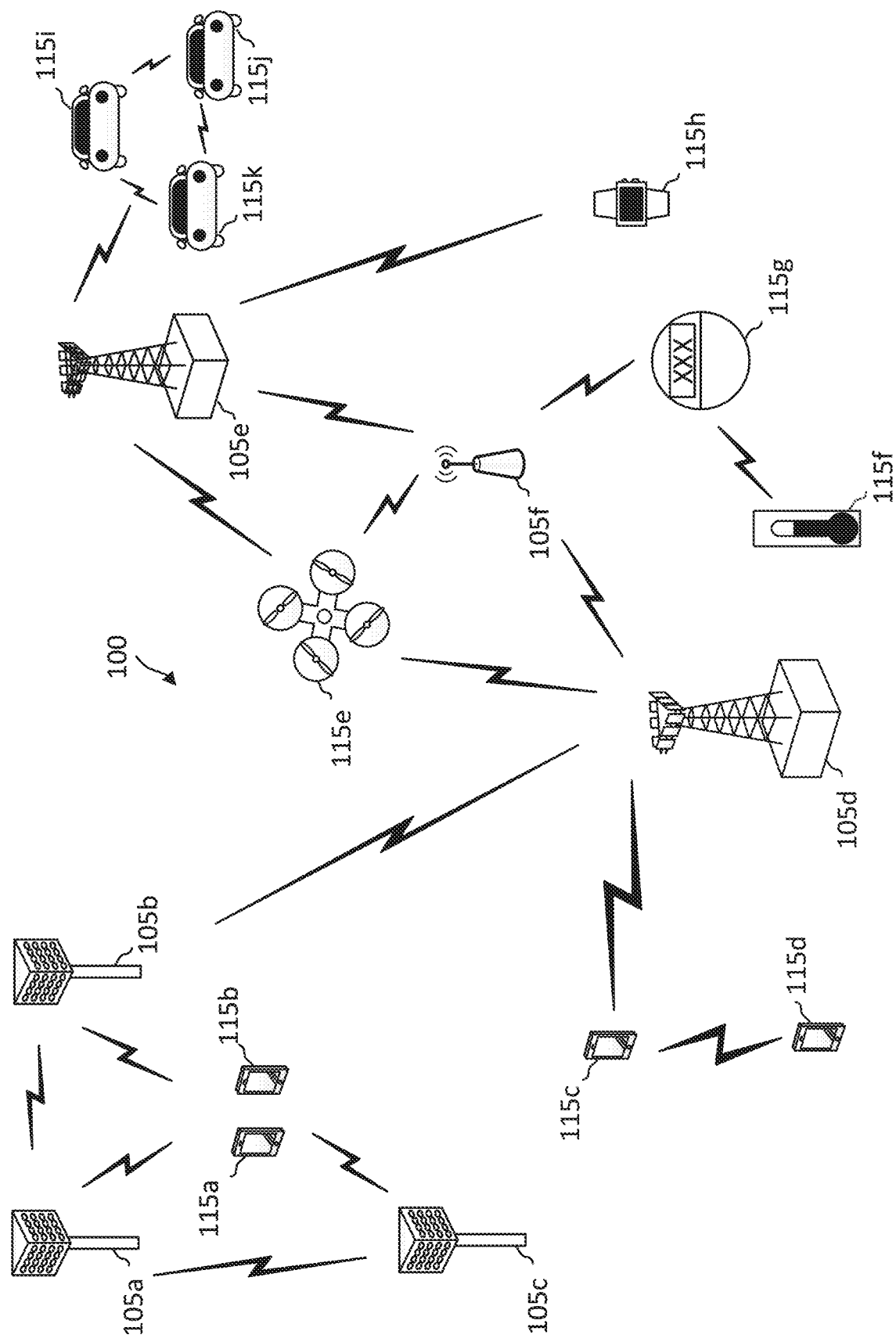
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a sidelink transmitting UE at one time and as a sidelink receiving UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

For mode-2 RRA, a sidelink UE may perform sensing in a sidelink resource pool. The sensing may include decoding SCI and/or measuring signal energy in the channel. For SCI decoding, the UE may blindly decode SCI from a PSCCH of each resource. If the decoding is successful, the UE may record the decoded SCI. For signal measurements, the UE may receive a signal from each resource and compute a reference signal received power (RSRP) and/or receive signal strength indicator (RSSI) for each resource. The UE may also record the signal measurements. The UE may generate a packet (e.g., a medium access control (MAC), packet data unit (PDU)) for transmission. Upon generating the packet, the UE may trigger a resource selection. The UE may define a sensing window and a resource selection window in the resource pool with respect to a time when the resource selection is triggered. The sensing window may be located prior to the trigger, and the resource selection window may be located after the trigger. The UE may determine the sensing window and the resource selection window based on a set of parameters, which may be preconfigured and/or predetermined). The UE may identify candidate resources within the resource selection window based on past sensing results (e.g., decoded SCI and/or signal measurements) obtained in the sensing window. In other words, the UE may predict resource usages in the resource selection window based on the past sensing results. The UE may randomly select a resource from the identified candidate resources. The selected resource may be within a fixed subchannel in a frequency domain and a fixed sidelink slot in a time domain. The UE may indicate a reservation for the selected resource. In other words, the reservation may have a granularity of a sidelink slot. The reservation can facilitate channel sensing multiple access (CSMA) among sidelink UEs (e.g., in an intra-sidelink system). In some instances, the UE may continue to perform sensing and perform a last-minute evaluation of the reserved resource (e.g., a T3 duration before the actual transmission time) to check whether the reserved resource is preempted by another UE. If the last-minute evaluation passes, which indicates that the reserved resource remains available, the UE may transmit a sidelink transmission (e.g., including SCI in a PSCCH and the packet in a PSSCH) using the selected resource. In some instances, the UE may select multiple resources from the candidate resources, for example, a first resource for an initial transmission of the packet and a second resource for a retransmission of the packet when hybrid automatic repeat request (HARQ) is used for the packet transmission.

In some cases, the sidelink UE may measure and/or determine a channel busy ratio (CBR) for transmission of the packet. For instance, to transmit the packet on a particular channel, the UE may determine the CBR for that channel before transmission. In some cases, the UE may determine the CBR for the channel based on decoded SCI, RSRP, and/or RSSI, which the UE may receive via communication with another sidelink UE. Further, the UE may be configured with a mapping from the CBR to a channel usage ratio (CR), which regulates channel access. For instance, greater CBR values may be mapped to smaller CR values, while smaller CBR values may be mapped to greater CR values. In this way, channel access attempts may be increasingly limited as traffic on the channel increases (e.g., the CBR of the channel increases). However, for communication within the licensed spectrum, inter sub-channel leakage, which may result from low-complexity receiver implementations, may result in erroneous CBR measurements and/or estimates at the UE. Moreover, in the case of NR deployed over an unlicensed spectrum (e.g., NR-unlicensed (NR-U)), the presence of other RATs in an unlicensed band may cause erroneous CBR estimates at the UE. As an illustrative example, a sub-channel may be detected as busy in a CBR estimate when it is actually occupied by other RATs. In both the licensed and the unlicensed spectrums, these erroneous CBR estimates may lead to channel access uncertainty and/or reduced communication efficiency within the network. For instance, if the sidelink UE detects an artificially (e.g., erroneously) high CBR estimate, which maps to a small CR value, the sidelink UE may be delayed or starved out by other RATs (e.g., the sidelink UE may be unable to access a channel). Accordingly, a more reliable indication of network traffic and/or channel congestion may improve communication efficiency within the network.

As used herein, the term "virtual collision" can refer to an event detected during a last-minute evaluation (e.g., re-evaluation) of a resource (e.g., a time-frequency resource). In particular, a virtual collision may occur with respect to a certain resource when a first UE selects the resource for transmission and, during a last-minute evaluation of the resource prior to the transmission, the first UE determines that a second UE has reserved the resource (e.g., via an SCI). For instance, the first UE may receive a re-selection flag associated with the resource that indicates the resource as unavailable. In some examples, a re-selection flag value of 1 may indicate the resource is unavailable and a re-selection flag of value of 0 may indicate the resource is available, or vice versa. In response to determining that the second UE has reserved the resource, the first UE may re-select a different resource for the transmission, avoiding simultaneous use of the resource by the first UE and the second UE that may have otherwise occurred. To that end, because the first UE reselects a transmission resource, the potential collision between the first UE and the second UE is virtual (e.g., hypothetical).

As described above, a virtual collision may result from multiple UEs attempting to reserve the same resource. Thus, the number and/or frequency of virtual collisions within a channel may increase with increasing channel congestion (e.g., traffic). Accordingly, metrics and/or statistics (e.g., mean, median, mode, rate, and/or the like) associated with the virtual collisions detected by a UE and/or on a channel may provide an indication of congestion on the channel (the sidelink resource pool). For instance, a virtual collision metric may correspond to a total number (e.g., quantity) of virtual collisions detected on a channel by a UE over time or within a certain time period (e.g., a rolling window). That is, for example, the virtual collision metric may correspond to a count of the re-selection flags set to indicate that a resource is unavailable, as described above. Additionally or alternatively, the virtual collision metric may correspond to an average number of virtual collisions per a time period, per communication (e.g., transmissions) on a channel, per resources selected for transmission, and/or the like. In some aspects, the virtual collision metric may correspond to a virtual collision rate. In this way, the virtual collision metric may provide an indication of a frequency of virtual collisions over time. In some aspects, the virtual collision metric may correspond to a number of potential collisions on a channel, such as the total number of resources that are unavailable on the channel (e.g., during resource selection for transmission and/or during a last-minute re-evaluation). In some aspects, the virtual collision metric may represent a percentage of time that the channel is determined to be occupied. Further, in some aspects, the virtual collision metric may be determined based on a log of unavailable resources, virtual collisions (e.g., re-selection flags), and/or the like. Moreover, virtual collision metrics may be used in addition or as an alternative to CBR estimates for the estimation of channel congestion.

The present application describes mechanisms for optimizing NR sidelink channel access using virtual collision metrics, such as the above-mentioned virtual collision metrics. For instance, a UE may perform a sidelink transmission based on a virtual collision metric associated with the availability of resources for transmission of the sidelink transmission. That is, for example, the virtual collision metric may indicate a quantity of unavailable resources for the sidelink transmission, a rate of virtual collisions on a channel for the sidelink transmission, a total number of virtual collisions on the channel, and/or the like. Based on the virtual collision metric, the UE may determine or adjust a channel access parameter, such as a contention window size, a transmission power level, a retransmission limit (e.g., a maximum number of retransmissions), traffic profile shaping (e.g., via a CR limit), and/or the like, and the UE may transmit the sidelink transmission based on the adjusted channel access parameter. Moreover, in some aspects, the UE may proactively optimize the NR sidelink channel access using virtual collision metrics. For instance, the UE may determine the virtual collision metrics as part of sidelink sensing (e.g., using re-selection flags from last-minute re-evaluation). In some aspects, the UE may determine the virtual collision metrics from measurement-only sensing without performing a transmission. That is, for example, the UE may select measurement-only resources (e.g., time-frequency resources) and may determine the virtual collision metrics based on the availability of the selected measurement-only resources, which the UE refrains from using for transmission. Additionally or alternatively, the UE may determine the virtual collision metrics from resources selected for transmission. Mechanisms for utilizing virtual collision metrics to optimize channel access are described in greater detail below.

In some aspects, the UE may select a plurality of resources from a sidelink resource pool, for example, based on random selections. A sidelink resource pool may refer to a set of time and frequency resources that may be used for sidelink operations. The UE may further request an evaluation of an availability of the selected resources. For instance, the UE may perform a last-minute re-evaluation of the selected resources. The UE may further receive an indication of the availability of the selected resources. In some aspects, the UE may receive the indication of the availability in response to the evaluation, for example, via re-selection flags in the sidelink re-evaluation procedure.

Further, the UE may perform, based on a virtual collision metric associated with the indication of the availability of the selected resources, a sidelink transmission.

In some aspects, the UE may receive an indication that one or more of the selected resources are unavailable. For instance, the UE may receive a re-selection flag associated with the one or more unavailable resources (reserved by other UEs). Further, the indication that one or more of the selected resources are unavailable (e.g., the re-selection flag) may correspond to a virtual collision. To that end, in some aspects, the UE may determine the virtual collision metric based on the indication of the one or more unavailable resources. In particular, the UE may determine the virtual collision metric based on the quantity of unavailable resources (e.g., a number of virtual collisions). The UE may further store a virtual collision log that includes a record of the of unavailable resources over time. In some aspects, the UE may further apply a filter to the virtual collision log. For instance, the UE may apply an averaging filter and/or the UE may apply a rolling time window to determine the virtual collision metric based on the filtered virtual collision log. In this way, the sensitivity of the virtual collision metric to a particular virtual collision (e.g., channel congestion at a particular time instant) may be tuned so that the impact of random virtual collisions on communication operations at the UE is suppressed.

In some aspects, the UE may determine, based on the indication of the availability of the selected resources, whether a first resource of the plurality of resources is available. If the UE selected the first resource for a transmission, the UE may determine whether to transmit a sidelink transmission using the first resource based on the determining whether the first resource is available. For instance, if the first resource is available, the UE may transmit the sidelink transmission using the first resource, and if the first resource is unavailable (reserved by another UE), the UE may refrain from transmitting in the first resource.

In some aspects, a resource of the selected resources is a measurement-only resource. In some aspects, the UE may use measurement-only resources to determine virtual collision metrics while refraining from using the measurement-only resources for transmission. As such, the measurement-only resources may remain available to other UEs in the sidelink system or UEs of other RATs for transmission. For instance, in some aspects, selecting the resources from the sidelink resource pool may involve selecting a first resource and a second resource of the plurality of resources based on a resource selection trigger, where the selected first resource is a measurement-only resource and the selected second resource may be used for a second sidelink transmission. Further, in some aspects, the UE may request the evaluation of the of the availability of the resources by transmitting, at a first time instant, a first evaluation request for the measurement-only resource (e.g., the first resource) and transmitting, at a second time instant different from the first time instant, a second evaluation request for the second resource. Subsequently, the UE may determine whether or not to perform the sidelink transmission using the second resource and may refrain from performing a sidelink transmission using the first resource (e.g., the measurement-only resource).

In some aspects, performing the sidelink transmission may involve determining, based on the virtual collision metric, a channel access parameter for the sidelink transmission, as discussed above. The channel access parameter may be associated with a transmission power for the sidelink transmission. In some aspects, the channel access parameter may be associated with a maximum number of retransmissions. Additionally or alternatively, the channel access parameter may be associated with a contention window size. Moreover, in some aspects, the channel access parameter may be associated a congestion control parameter, such as a CR and/or a CBR. Further, the UE may determine when to utilize the virtual collision metrics for determining or adjusting the channel access parameter, for example, based on a virtual collision logging period satisfying a threshold, based on a quantity of the resources selected for determining the virtual collision metric satisfying a threshold, and/or based on the virtual collision metric satisfying a threshold.

In some aspects, the UE may perform the sidelink based on the virtual collision metric satisfying a threshold. In some aspects, to perform the sidelink transmission, the UE may select, based on a congestion control, a second resource from the sidelink resource pool for the sidelink transmission and determine, based on a configuration, to utilize the virtual collision metric for the congestion control. The configuration may include an indication indicating whether utilizing the virtual collision metric for the congestion control is allowed. Additionally or alternatively, the configuration may include an indication indicating that utilizing the virtual collision metric for the congestion control is allowed based on at least one of a capability of the UE, a zone (e.g., a geographical area) associated with the UE, a time period associated with the congestion control, or a detection of a radio access technology (RAT) different from a RAT of the UE.

In some aspects, the UE may transmit, to a base station (BS), a report indicating the virtual collision metric. Moreover, the UE may transmit the report based on a reporting periodicity. For instance, the UE may transmit a report indicating the virtual collision metric to the BS at a regular interval. Additionally or alternatively, the UE may transmit the report for the virtual collision metric based on a reporting trigger. In some aspects, the UE may receive, from the BS, a configuration for reporting the virtual collision metric.

In some aspects, the sidelink resource pool is in a licensed band, and in some aspects, the sidelink resource pool is in an unlicensed band.

In some aspects, each of the resources selected by the UE are measurement-only resources. For instance, in some aspects, the UE may perform measurement-only sensing in a sidelink resource pool. That is, for example, the UE may select measurement-only resources from the sidelink resource pool and may obtain an availability of the measurement-only resources. Further, the UE may perform, based on a virtual collision metric associated with the availability of the measurement-only resources obtained from the measurement-only sensing, a sidelink transmission. To that end, the UE may determine the virtual collision metric without performing a transmission. Moreover, the UE may perform the sidelink transmission based on the virtual collision metric without using the measurement-only resources for the transmission. In some aspects, the UE selects the exclusively measurement-only resources based on a measurement-only sensing configuration. The UE may receive the measurement-only sensing configuration from a BS, for example. Further, in some aspects, the measurement-only sensing configuration indicates a periodicity, and the UE may select the resources based on this periodicity. Additionally or alternatively, the measurement-only sensing configuration may include an indication of an event associated with at least one of a geographical zone, a missed packet delay budget (PDB), or a virtual collision metric threshold. The UE may select the resources based on a detection of the event included in the measurement-only sensing configuration. Further, in some aspects, the UE may receive the measurement-only sensing configuration at a medium access control (MAC) layer.

Aspects of the present disclosure can provide several benefits. For example, use of virtual collision metrics may be used for adaptive congestion control. In particular, channel access parameters, such as a contention window size, a transmission power level, a retransmission limit (e.g., a maximum number of retransmissions), traffic profile shaping (e.g., via a CR limit), and/or the like, may be determined and/or adjusted based on virtual collision metrics. As an illustrative example, based on virtual collision metrics, the contention window size associated with a transmission from a UE may increase with increasing congestion on a channel so that the UE has more opportunity for a successful transmission. To that end, by adapting transmissions based on channel congestion, communication efficiency within a network may improve. Further, using virtual collision metrics to estimate channel congestion may provide more accurate results than using estimations determined based on CBR. As such, the techniques described herein may provide better channel congestion control, reduce channel access uncertainty and/or may increase communication efficiency within a network. Moreover, a virtual collision may impact a UE and/or a channel much less than an actual collision on the channel. That is, for example, the identification of a collision at a resource during a last-minute evaluation and the re-selection by the UE of an alternative resource for transmission may cause less disruption (e.g., interference) on the channel than the UE and another device simultaneously transmitting using the same resource. To add, virtual collision metrics may be collected based on measurement-only resources without transmitting data or disrupting the channel and/or network, further reducing the impact on the channel. By collecting virtual collision metrics with measurement-only resources, a UE may proactively optimize channel access parameters so that when the UE is ready to transmit on the channel, the UE may transmit based on parameters tuned to the congestion on the channel, thereby reducing the chance of an unsuccessful and/or delayed transmission.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PB CH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

Figure 2:
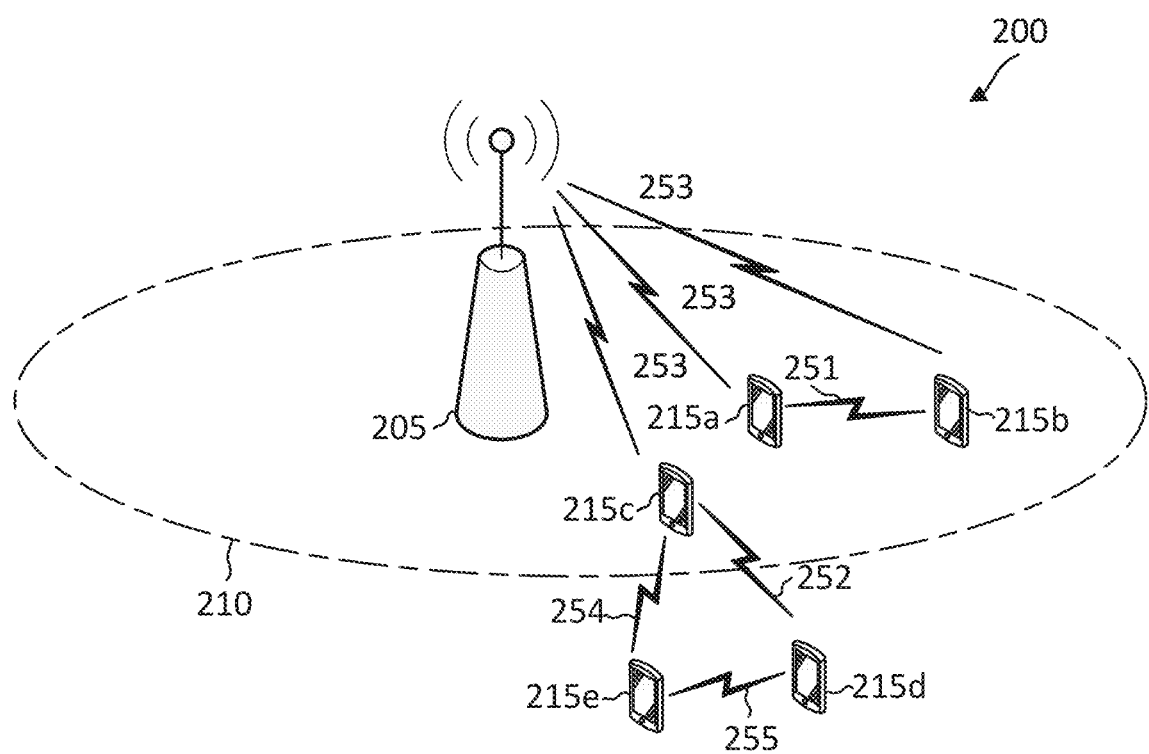
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. SCI may also carry information to reserve future resources (e.g., up to about two future PSSCH for retransmissions with HARQ). In some examples, a sidelink transmitting UE 115 may indicate SCI in two stages. In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include a -bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

In some aspects, a pair of sidelink transmitting UE 115 and sidelink receiving UE 115 may communicate with each other using the autonomous mode-2 RRA discussed above. For instance, the sidelink transmitting UE 115 may continuously sense or monitor resources in a sidelink resource pool. The sensing or monitoring may include decoding SCI decoding and/or measuring signal energy in the channel. The sidelink transmitting UE 115 may record the SCI decoding results and the signal measurements. Upon receiving a data packet for transmission, the sidelink transmitting UE 115 may determine a resource selection window and identify candidate resources from the resource selection window based on sensing results (e.g., decoded SCI and signal measurements) obtained from a sensing window as will be discussed more fully below in FIGS. 3A-3B. The sidelink transmitting UE 115 may randomly select a resource from the candidate resources and transmit a sidelink transmission (e.g., including SCI over a PSCCH and/or data over a PSSCH) using the selected resource.

According to aspects of the present disclosure, the sidelink transmitting UE 115 may, determine a virtual collision metric based on the availability of selected resources during a last-minute re-evaluation. In particular, the sidelink transmitting UE 115 may determine whether resources selected by the sidelink transmitting UE 115 (e.g., based on the sensing results) have become unavailable before the sidelink transmitting UE 115 makes a transmission using one or more of the resources. That is, for example, the sidelink transmitting UE 115 may determine whether a virtual collision has resulted from the selection of a resource by the sidelink transmitting UE 115 and a reservation of the same resource by another wireless communication device (e.g., another UE). The UE 115 may further determine a virtual collision metric based on identified virtual collisions. For instance, the UE 115 may determine a total number of virtual collisions, a rate and/or a frequency of virtual collisions, and/or the like as the virtual collision metric. To that end, the virtual collision metric may provide an indication of a level of traffic (e.g., congestion) on a channel corresponding to the resources. In some aspects, the sidelink transmitting UE 115 may transmit the sidelink transmission based on the virtual collision metric. For instance, the sidelink transmitting UE 115 may adapt one or more channel access parameters associated with the sidelink transmission based on the virtual collision metric. In this way, the sidelink transmitting UE 115 may optimize channel access associated with the sidelink transmission based on a level of channel congestion indicated by the virtual collision metric, as will be described more fully.

FIG. 2 illustrates an example of a wireless communication network 200 that provisions for sidelink communications according to aspects of the present disclosure. The network 200 may correspond to a portion of the network 100. FIG. 2 illustrates one BS 205 and five UEs 215 (shown as 215a, 215v, 215c, 215d, and 215e) for purposes of simplicity of discussion, though it will be recognized that aspects of the present disclosure may scale to any suitable number of UEs 215 (e.g., the about 2, 3, 4, 5, 7 or more) and/or BSs 205 (e.g., the about 2, 3 or more). The BS 205 and the UEs 215 may be similar to the BSs 105 and the UEs 115, respectively. The BS 205 and the UEs 215 may share the same radio frequency band for communications. In some instances, the radio frequency band may be a licensed band. In some instances, the radio frequency band may be an unlicensed band (e.g., in a 5 GHz band). In some instances, the radio frequency band may be a frequency range 1 (FR1) band. In some instances, the radio frequency band may be a FR2 band. In general, the radio frequency band may be at any suitable frequency and may have any suitable bandwidth (e.g., about 5 MHz, about 10 MHz, about 20 MHz, about 80 MHz, about 100 MHz or more).

In the network 200, some of the UEs 215 may communicate with each other in peer-to-peer communications. For example, the UE 215a may communicate with the UE 215b over a sidelink 251, the UE 215c may communicate with the UE 215d over a sidelink 252 and/or with the UE 215e over a sidelink 254, and the UE 215d may communicate with the UE 215e over a sidelink 255. The sidelinks 251, 252, 254, and 255 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d and UE 215e are outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

Figure 3A:
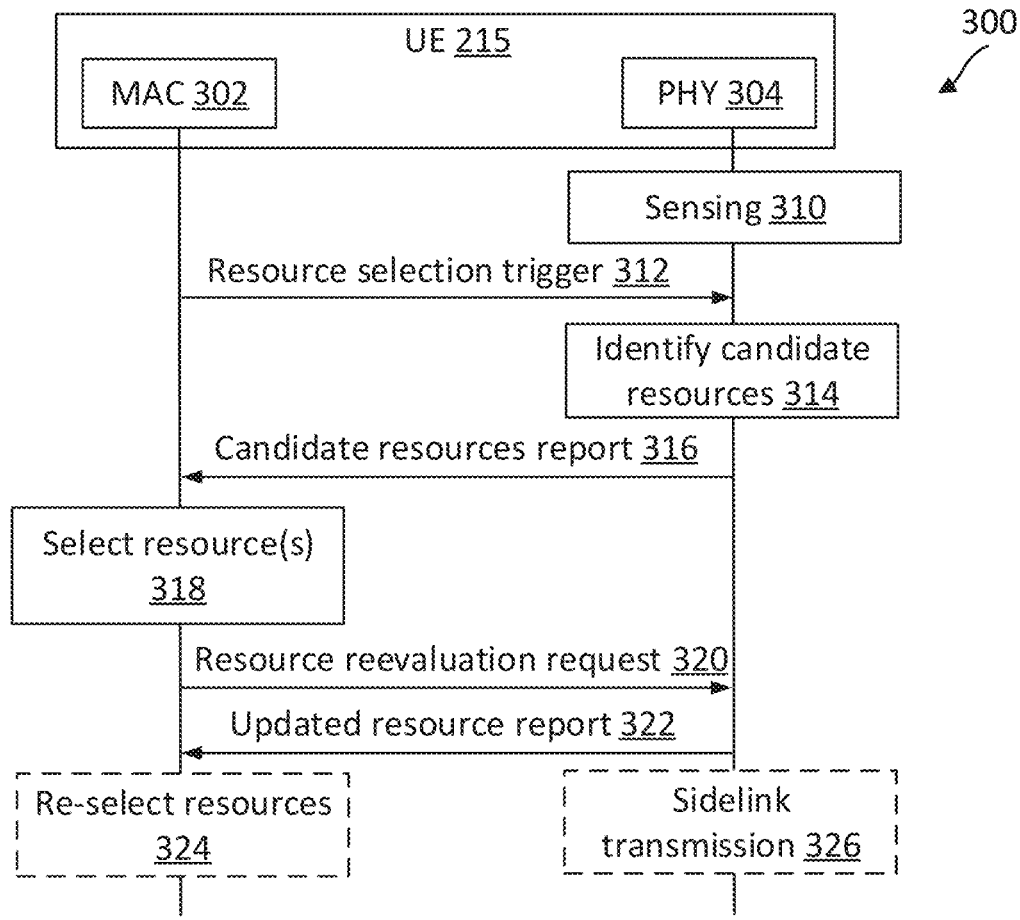
FIG. 3A is a sequence diagram illustrating an autonomous sidelink sensing method according to some aspects of the present disclosure.
Figure 3B:
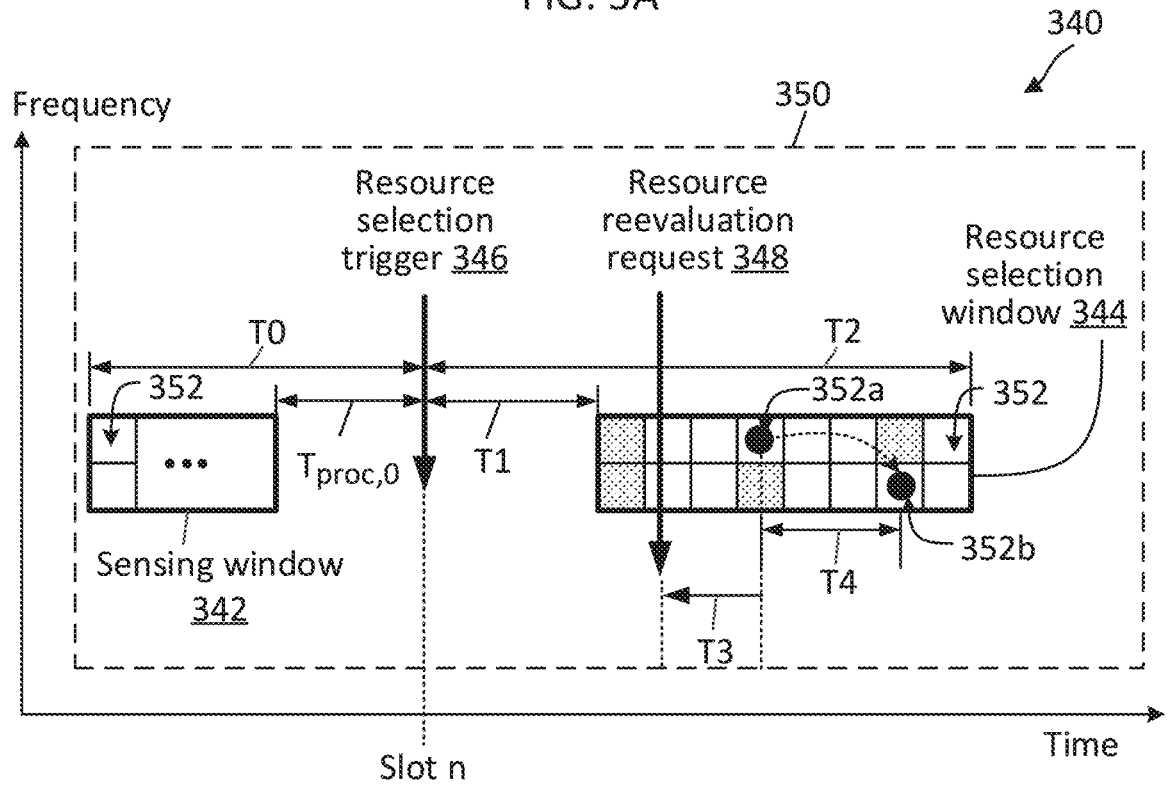
FIG. 3B illustrates an autonomous sidelink sensing scheme according to some aspects of the present disclosure.

FIGS. 3A and 3B are discussed in relation to each other to illustrate autonomous sidelink sensing using mode-2 RRA. FIG. 3A is a sequence diagram illustrating an autonomous sidelink sensing method 300 according to some aspects of the present disclosure. The method 300 may be implemented by a UE 215. As illustrated, the method 300 includes a number of enumerated actions, but aspects of the method 300 may include additional actions before, after, and in between the enumerated actions. In some aspects, one or more of the enumerated actions may be omitted or performed in a different order.

The autonomous sidelink sensing may be implemented between a MAC layer 302 and a PHY layer 304 at the UE 215. As shown, at action 310, the PHY layer 304 performs sensing in a sidelink resource pool (e.g., the sidelink resource pool 350 of FIG. 3B). A sidelink resource pool may refer to a set of time and frequency resources that may be used for sidelink operations. For instance, the PHY layer 304 may continuously sense or monitor resources (e.g., the resources 352 for FIG. 3B) in the sidelink resource pool. The sensing or monitoring may include decoding SCI and/or measuring signal energy in the channel. For SCI decoding, the PHY layer 304 may blindly decode SCI from a PSCCH of each resource. If the decoding is successful, the PHY layer 304 may record the decoded SCI. For signal measurements, the PHY layer 304 may receive a signal from each resource and compute a reference signal received power (RSRP) and/or receive signal strength indicator (RSSI) for each resource. The PHY layer 304 may also record the signal measurements.

At action 312, the MAC layer 302 sends a resource selection trigger (e.g., the resource selection trigger 346 of FIG. 3B) to the PHY layer 304. In some aspects, the MAC layer 302 may transmit the resource selection trigger based on a MAC packet data unit (PDU) being generated and ready for transmission.

At action 314, in response to the resource selection trigger, the PHY layer 304 identifies candidate resources from the resource pool based on the sensing result. In this regard, the PHY layer 304 may determine a sensing window (e.g., the sensing window 342 of FIG. 3B) and a resource selection window (e.g., a resource selection window 344 of FIG. 3B) based on the resource selection trigger. The PHY layer 304 may identify candidate resources from the resource selection window based on past sensing results (e.g., decoded SCI and/or signal measurements) obtained in the sensing window. The resource selection trigger, the sensing window, and the resource selection window are shown in FIG. 3B.

FIG. 3B illustrates an autonomous sidelink sensing scheme 340 according to some aspects of the present disclosure. The scheme 340 may be employed by the UE 215 or any other UEs such as the UEs 115 and 215. In FIG. 3B, the x-axis represents time in some arbitrary units, and the y-axis represents frequency in some arbitrary units.

In the scheme 340, the UE 215 is preconfigured with a sidelink resource pool 350. The sidelink resource pool 350 may span a certain frequency bandwidth in a licensed band. The sidelink resource pool 350 may include a plurality of time-frequency resources 352. Each resource 352 may include a certain number of symbols (e.g., OFDM symbols) in time and a certain number of frequency subcarriers in frequency. In some aspects, the resource 352 may be in units of RBs (e.g., including 12 consecutive subcarriers in frequency and a time duration of a slot or any suitable time duration). FIG. 3B illustrates the sidelink resource pool 350 over a certain time period. In general, a sidelink resource pool may include time-frequency resources over consecutive slots (e.g., a continuous time period) and/or slots that are spaced apart in time (e.g., non-consecutive time periods).

In the illustrated example of FIG. 3B, the MAC layer 302 may generate a MAC PDU at slot n and may generate a resource selection trigger 346 at slot n. Upon receiving the resource selection trigger 346, the PHY layer 304 may define a sensing window 342 and a resource selection window 344 with respect to the time of the resources selection trigger 346 based on a set of parameters including $T_{proc,0}$, $T_{proc,1}$, T0, T1, T2, and $T2_{min}$. For instance, the PHY layer 304 may determine a start of the sensing window 342 based on a T0 duration before the resource selection trigger 346 and may determine an end of the sensing window 342 based on a $T_{proc,0}$ duration before the resource selection trigger 346. As shown, the sensing window 342 starts at the start of the T0 duration and ends at the start of the $T_{proc,0}$ duration. The PHY layer 304 may determine a start of the resource selection window 344 based on a T1 duration after the resource selection trigger 346 and may determine an end of the resource selection window 344 based on a T2 duration after the resource selection trigger 346. The T1 duration may have an upper bound limited by the parameter $T_{proc,1}$ (e.g., $0 \le T1 \le T_{proc,1}$). The T2 duration can be determined to meet a certain packet delay budget (PDB) and may have a lower bound limited by $T2_{min}$ (e.g., $T2_{min} \le T2 \le PDB$). As shown, the resource selection window 344 starts at the end of the T1 duration and ends at the end of the T2 duration. In some aspects, the PHY layer 304 may be preconfigured with some of the parameters (e.g., $T_{proc,0}$, $T_{proc,1}$). In some aspects, the PHY layer 304 may receive some of the parameters (e.g., T1, T2, $T2_{min}$) from an upper layer (e.g., an RRC layer). Although FIG. 3B illustrates the resource selection window 344 including 16 resources, it should be understood that in other examples a resource selection window can include a less number of resources (e.g., about 4, 5, 6, 8, or 10) or a greater number of resources (e.g., 17, 18, 19, 20, 24, 32, or more).

The PHY layer 304 may identify candidate resources 352 within the resource selection window 344 by examining or analyzing sensing results obtained within the sensing window 342. In other words, the PHY layer 304 may utilize past sensing results to predict future usages of resources 352 in the resource selection window 344. The PHY layer 304 may use a combination of SCI decoding, signal measurements, and/or priority information to identify candidate resources. In some aspects, the PHY layer 304 may exclude resources 352 in the resource selection window 344 that are reserved (e.g., based on SCI decoding in the sensing window 342 and/or prediction). The PHY layer 304 may exclude resources 352 in the resource selection window 344 that are to be used for transmissions with a higher traffic priority than the UE 215 (e.g., based on SCI decoding in the sensing window 342 and/or prediction). The PHY layer 304 may exclude resources 352 in the resource selection window 344 based on resources 352 within the sensing window 342 that have signal measurements (e.g., RSRP and/or RSSI) higher than a certain signal threshold and a predicted resource usage pattern. The PHY layer 304 may perform the resource filtering or exclusion by SCI decoding, priority, and/or signal measurements in the resource selection window 344 in any suitable order. If the remaining candidate resources 352 in the resource selection window 344 is less than 20% of the total resources in the resource selection window 344, the PHY layer 304 may increase the signal threshold and repeat the resource filtering or exclusion until the candidate resources 352 in the resource selection window 344 is about 20% of the total resources 352 in the resource selection window 344. In FIG. 3B, the candidate resources (available resources) 352 in the resource selection window 344 are shown as empty-filled boxes. The unavailable resources 352 are shown as pattern-filled boxes.

Returning to FIG. 3A, at action 316, the PHY layer 304 sends a candidate resource report indicating the identified candidate resources 352 (e.g., the empty-filled boxes in the resource selection window 344 shown in FIG. 3B). The report may indicate the time and frequency location information for the candidate resources.

At action 318, upon receiving the candidate resource report, the MAC layer 302 selects one or more resources from the candidate resources. For instance, the MAC layer 302 may randomly select a first resource from the candidate resources for transmitting the MAC PDU. As an example, if report includes a list of N candidate resources, the MAC layer 302 may draw a random number (e.g., k) between 1 and N and select $k^{th}$ candidate resources. In some instances, the UE 215 may apply HARQ to the transmission of a transport block (TB) (carrying the MAC PDU) and may retransmit the same TB upon receiving a NACK or failing to receive an ACK for the transmission from a corresponding receiving UE. Thus, the MAC layer 302 may also randomly select a second resource from the candidate resources by drawing another random number between 1 and N, for example, for a potential retransmission of the MAC PDU. FIG. 3B illustrates an example of the resource selection.

Referring to FIG. 3B, the MAC layer 302 may randomly select a first resource 352a (shown by a black circle) from the candidate resources for an initial transmission and may randomly select a second resource 352b (shown by a black circle) from the candidate resources for a retransmission. In some instance, the MAC layer 302 may select the second resource 352b for the retransmission such that the first resource 352a and the second resource 352b are separated by a T4 duration. In some aspects, the T4 duration may be less than about 32 slots or any other suitable time duration. In some aspects, the T4 duration may have a predetermined or preconfigured lower bound and/or upper bound.

Referring to FIG. 3A, at action 320, the MAC layer 302 sends a resource reevaluation request (e.g., the resource reevaluation request 348 of FIG. 3B) to the PHY layer 304. The resource reevaluation request may request the PHY layer 304 to report updated available resources at this time instant to double check whether the previously selected resources (e.g., resources 352a and 352b of FIG. 3B) are still available. In some instances, the MAC layer 302 may send the resource reevaluation request slightly before (e.g., 1 symbol, 2 symbols, 3 symbols, 4 symbols, or a slot) the actual time where the MAC PDU is to be transmitted using the selected first resource (e.g., the resource 352a in FIG. 3B). As such, the resource reevaluation request can also be referred to as a "last-minute re-evaluation".

Referring to FIG. 3B, the MAC layer 302 sends a resource reevaluation request 348 at T3 duration before the actual transmission time for the selected first resource 352a. In some aspects, the T3 duration may have a predetermined or preconfigured lower bound and/or upper bound.

Referring to FIG. 3A, at action 322, in response to the resource reevaluation request, the PHY layer 304 sends an updated resource report to the MAC layer 302. The PHY layer 304 may identify resources in the resource selection window 344 that are still available at the time instant when the resource reevaluation request is received. The PHY layer 304 may use substantially similar mechanisms as discussed at action 314 to identify available resources (candidate resources) at that time instant. If the first resource (e.g., the resource 352a) previously selected by the MAC layer 302 is no longer available, the PHY layer 304 may indicate an indication in the report. For instance, the report may include a re-selection flag set to 1 for the first resource. Similarly, if the second resource (e.g., the resource 352b) previously selected by the MAC layer 302 is no longer available, the PHY layer 304 may indicate an indication in the report. For instance, the report may include a re-selection flag set to 1 for the second resource.

If the first resource is no longer available, the MAC layer 302 may re-select another resource from the candidate resources indicated in the updated candidate resource report at action 324 and may repeat the action 320 and 322 at a later time for another last-minute resource reevaluation for newly selected resource. Otherwise, the PHY layer 304 may transmit the MAC PDU to another sidelink UE (e.g., the UEs 115 and/or 215) using the selected first resource at action 326.

Similarly, if the second resource (to be used for the retransmission) is no longer available, the MAC layer 302 may re-select another resource from the candidate resources indicated in the updated candidate resource report at action 324. The MAC layer 302 may also request the PHY layer 304 for a last-minute resource reevaluation for the resource to be used for the retransmission.

Figure 4:
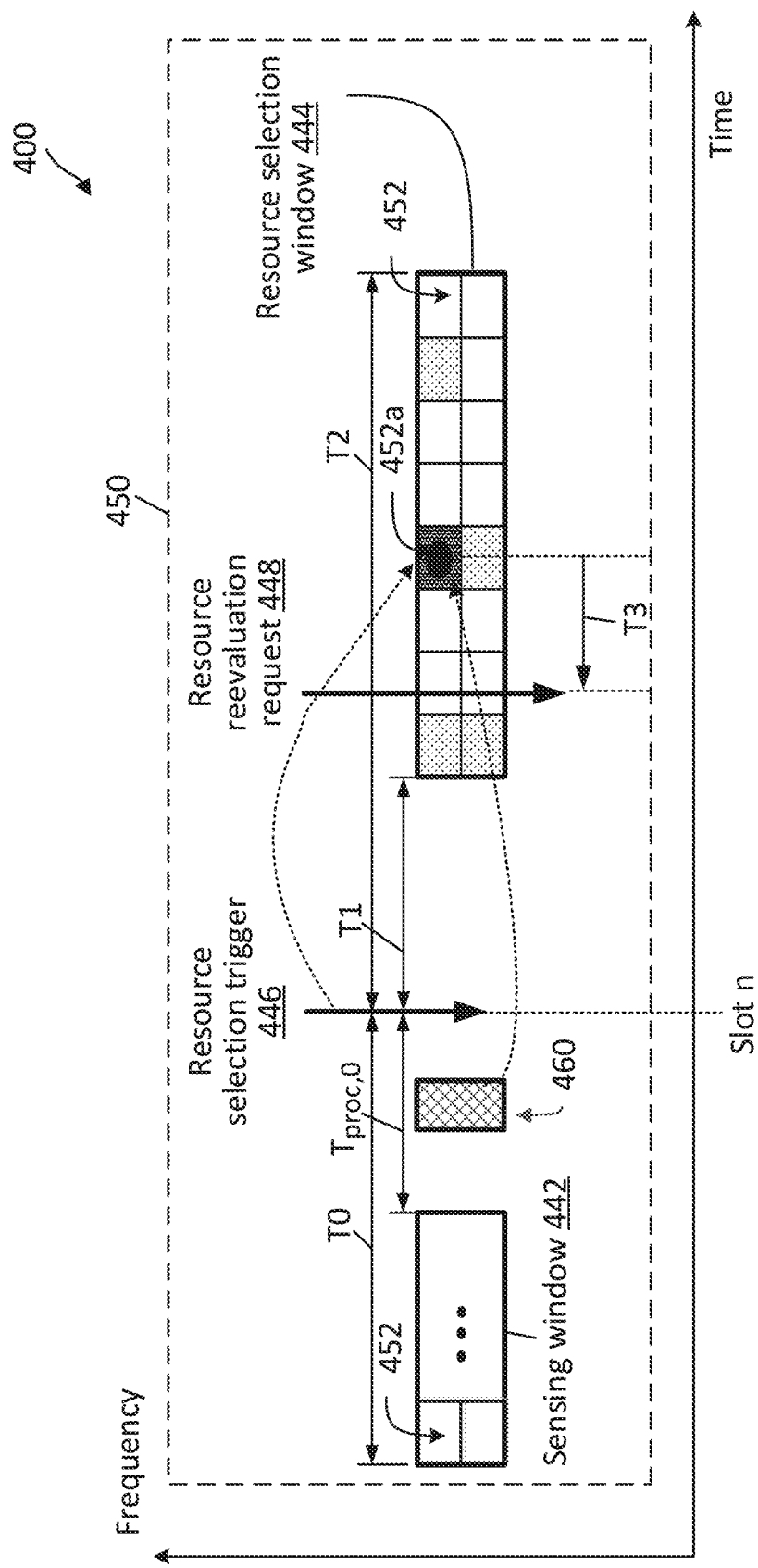
FIG. 4 illustrates an autonomous sidelink sensing scheme according to some aspects of the present disclosure.

FIG. 4 illustrates an autonomous sidelink sensing scheme 400, and, in particular, FIG. 4 illustrates an example of a virtual collision, according to some aspects of the present disclosure. The scheme 400 may be employed by the UE 215 or any other UEs such as the UEs 115 and 215. In FIG. 4, the x-axis represents time in some arbitrary units, and the y-axis represents frequency in some arbitrary units.

In the scheme 400, the UE 215 is preconfigured with a sidelink resource pool 450. The sidelink resource pool 450 may span a certain frequency bandwidth in an unlicensed band or shared frequency band. The sidelink resource pool 450 may be similar to the sidelink resource pool 350 and is illustrated using the same resource pool structure as in FIG. 3B. As shown, the sidelink resource pool 450 may include a plurality of time-frequency resources 452, which may be similar to the time-frequency resources 352 of FIG. 3B. Each resource 452 may include a certain number of symbols (e.g., OFDM symbols) in time and a certain number of frequency subcarriers in frequency. In some aspects, the resource 452 may be in units of RBs (e.g., including 12 consecutive subcarriers in frequency and a time duration of a slot or any suitable time duration). FIG. 4 illustrates the sidelink resource pool 450 over a certain time period. In general, a sidelink resource pool may include time-frequency resources 452 over consecutive slots (e.g., a continuous time period) and/or slots that are spaced apart in time (e.g., non-consecutive time periods).

In the illustrated example of FIG. 4, the MAC layer 302 may generate a resource selection trigger 446 at slot n. Upon receiving the resource selection trigger 446, the PHY layer 304 may define a sensing window 442 and a resource selection window 444 with respect to the time of the resources selection trigger 446 based on a set of parameters including $T_{proc,0}$, $T_{proc,1}$, T0, T1, T2, and $T2_{min}$, as generally described above with reference to FIG. 3B. Although FIG. 4 illustrates the resource selection window 444 including 16 resources, it should be understood that in other examples a resource selection window can include a less number of resources (e.g., about 4, 5, 6, 8, or 10) or a greater number of resources (e.g., 17, 18, 19, 20, 24, 32, or more).

The PHY layer 304 may identify candidate resources 452 within the resource selection window 444 by examining or analyzing sensing results obtained within the sensing window 442. In other words, the PHY layer 304 may utilize past sensing results to predict future usage of resources 452 in the resource selection window 444, as generally described above with reference to FIG. 3A-B. In FIG. 4, the candidate resources (available resources) 452 in the resource selection window 444 are shown as empty-filled boxes. The unavailable resources 452 are shown as pattern-filled boxes.

In the illustrated example of FIG. 4, the UE 215 selected a first resource 452a (shown by a black circle) at the MAC 302. For instance, the MAC 302 may randomly select the first resource 452a from the candidate resources. In some cases, however, a resource selected (e.g., reserved) by the UE 215 may be preempted or become unavailable before the UE 215 performs a transmission of a sidelink transmission using the selected resource. In other words, a virtual collision may occur at a resource selected by the UE 215 and reserved by another wireless communication device (e.g., another UE).

For instance, while a selected resource may appear available for transmission by the UE 215 based on past sensing results, another UE may have previously reserved the resource 452, making it unavailable for use by the UE 215. In some instances, for example, a UE may transmit a reservation 460 (e.g., via an SCI) for a particular resource 452, such as resource 452a, within the $T_{proc,0}$ duration (e.g., a time between the end of the sensing window 442 and the resource selection trigger 446 at slot n). Accordingly, because the UE 215 may select a resource 452 for transmission based on candidate resources identified as available within the sensing window 442, which is defined by a time period preceding the reservation 460 (e.g., the T0 duration and the $T_{proc,0}$ duration before the resource selection trigger 446), the UE 215 may identify the resource 452a as available. After identifying the resource 452a as available, the UE 215 may select the resource 452a for a transmission even though at the time of the resource selection trigger 446 (e.g., slot n), the reservation 460 was already transmitted by another UE. As a result, the UE 215 may determine, during a last-minute re-evaluation of the resource 452*a* (e.g., in response to the resource reevaluation request 448), that a virtual collision has occurred at the resource 452*a*. More specifically, the UE 215 may detect the reservation 460 (e.g., via SCI decoding) based on the last-minute re-evaluation. In particular, the PHY 304 may sense the reservation 460 during the last-minute re-evaluation, and in response to determining that the resource 452*a* is unavailable due to the reservation 460, the PHY 304 may set a re-selection flag. The MAC 302 may receive the re-selection flag indicating that the resource 452*a* is unavailable and may re-select a different resource for transmission. For instance, the MAC 302 may re-select the resource from among resources included in an updated resource report, as described above with reference to actions 322 and 324 of FIG. 3A. Accordingly, the UE 215 may reschedule the transmission to an alternative resource 452.

Figure 5:
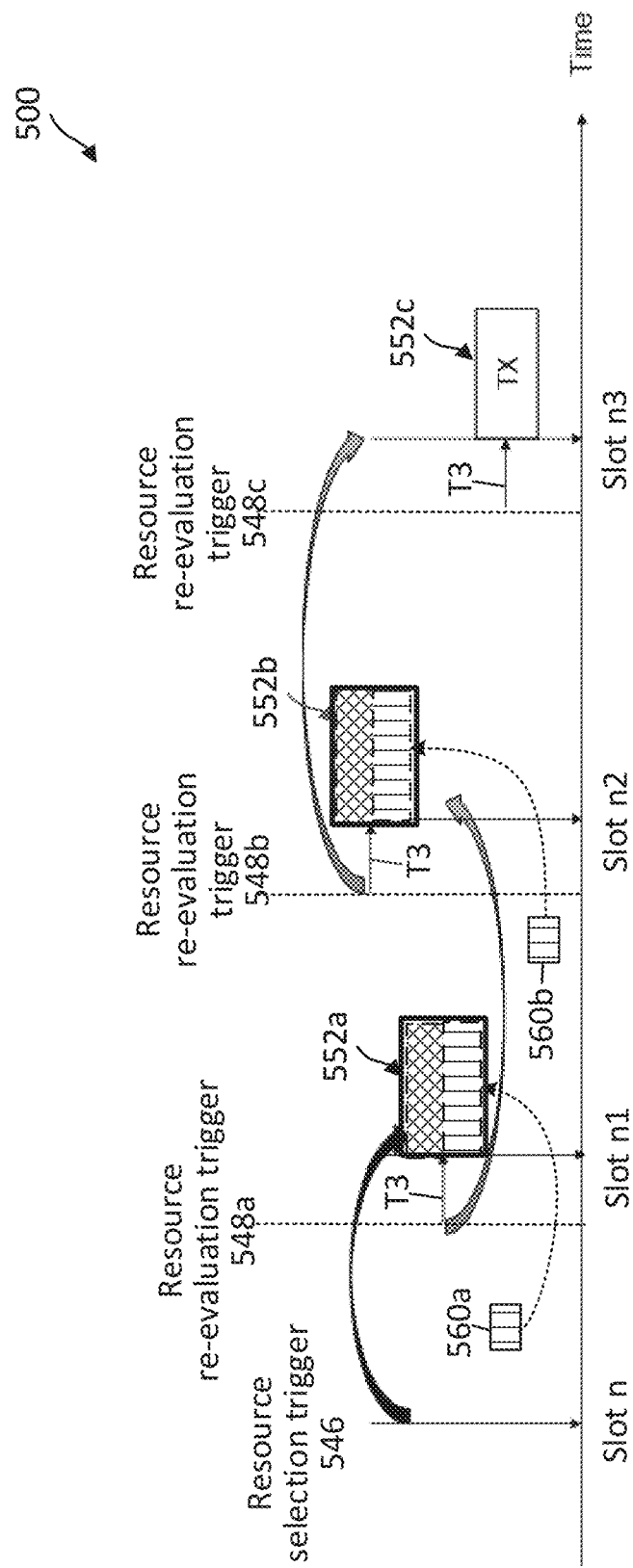
FIG. 5 illustrates a plot of a sidelink transmission scenario according to some aspects of the present disclosure.

In some cases, reselection of a resource for transmission and/or a retransmission may result in an additional last-minute re-evaluation by the UE 215, as illustrated in FIG. 5. FIG. 5 illustrates a sidelink transmission scenario 500 according to some aspects of the present disclosure. In FIG. 5, the x-axis represents time in some arbitrary units. Additionally, the resources 552*a-c* may be similar to the resources 352 and/or 452 described herein, the resource selection triggers 546*a* may be similar to the resource selection triggers 346 and/or 446 described herein, and the resource re-evaluation triggers 548*a-c* may be similar to the resource re-evaluation triggers 348 and/or 448 described herein. Further, the UE 215 may employ similar resource selection and last-minute re-evaluation techniques as discussed above with respect to FIGS. 3A and 3B.

As illustrated, at slot n, the UE 215 (e.g., a first UE) may reserve a first resource 552*a* at slot n1 in response to a first resource selection trigger 546. At a time T3 before slot n1 corresponding to the first resource 552*a*, the UE 215 may perform a first resource re-evaluation in response to a first resource re-evaluation trigger 548*a*. That is, for example, the UE 215 may perform a last-minute re-evaluation of the first resource 552*a*. The UE 215 may determine, based on the last-minute re-evaluation, that the first resource 552*a* is unavailable for transmission by the UE 215. In particular, the UE 215 may determine that the first resource 552*a* had been reserved by another UE (e.g., a second UE) of the same sidelink system or of another system or another RAT. To that end, the UE 215 may identify a reservation 560*a* of the second UE for the same first resource 552*a* that is selected by the UE 215. For instance, the second UE may transmit SCI including the reservation 560*a*. For the purposes of clarity, earlier resource selections by the UE 215 are shown by the diamond-filled boxes, while resource reserved (e.g., via SCI) by a second UE are shown by the vertical-stripe-filled boxes. As can be seen in FIG. 5, the first resource 552*a* is selected by the UE 215 (the diamond-filled box) and reserved by the second UE (the vertical-stripe-filled box). Although the diamond-filled box and the vertical-stripe-filled box are shown to occupy different portions of the first resource 552*a*, the selection and/or the reservation are for the entire first resource 552*a*.

As described above, the UE 215 may identify a virtual collision at the first resource 552*a* between the selection by the UE 215 and the reservation 560*a* by the second UE at the MAC 302. That is, for example, the MAC 302 may receive a re-selection flag associated with the first resource 552*a* and set by the PHY 304. For instance, the PHY 304 may set the re-selection flag to a value of 1 to indicate the first resource 552*a* is unavailable (reserved by the second UE). In response to the re-selection flag (being set to a value of 1), the UE 215 may re-select (e.g., reschedule) the transmission to a second resource 552*b*. In particular, the UE 215 may re-select the second resource 552*b* based on an updated resource report, as described above with reference to action 322 and action 324 of FIG. 3A.

As similarly described above with respect to the first resource re-evaluation, the UE 215 may, at a time T3 before slot n2 corresponding to the second resource 552*b*, perform a second resource re-evaluation (e.g., a last-minute re-evaluation) in response to a second resource re-evaluation trigger 548*b*. Based on this last-minute re-evaluation, the UE 215 may identify a virtual collision at the second resource 552*b* (e.g., the MAC 302 may receive a re-selection flag indicating the resource 552*b* being unavailable) between the selection made by the UE 215 and reservation 560*b* made by another UE (e.g., the second UE or a third UE). Accordingly, the UE 215 may once again reschedule the transmission. More specifically, the UE 215 may select a third resource 552*c* to perform the transmission.

At a time T3 before slot n3 corresponding to the third resource 552*c*, the UE 215 may perform a third resource re-evaluation (e.g., a last-minute re-evaluation) in response to a third resource re-evaluation trigger 548*c*. Based on this last-minute re-evaluation, the UE 215 may determine that the third resource 552*c* is available for the transmission. That is, for example, the UE 215 may determine that a collision at the third resource 552*c* between the UE 215 and another device may not occur. Accordingly, the UE 215 may perform a transmission, such as a sidelink transmission, using the third resource 552*c*. Thus, in the illustrated example, the UE 215 performs the transmission with a delay of two resource re-selections (e.g., corresponding to the duration (slot n3)–(slot n)) resulting from two virtual collisions (e.g., at the first resource 552*a* and the second resource 552*b*, respectively).

Accordingly, FIG. 5 provides an illustrative example of the impact of channel traffic (e.g., channel congestion) on the communication efficiency of the UE 215. That is, for example, the illustrated virtual collisions (e.g., at the first resource 552*a* and the second resource 552*b*, respectively) result from channel use (e.g., traffic) by other devices and may cause delays to transmissions made by the UE 215. To that end, FIG. 5 may illustrate that as traffic on the channel increases, the delays to transmissions made by the UE 215 may increase. In particular, FIG. 5 shows that virtual collisions may result in rescheduled transmissions, and as channel traffic increases, virtual collisions and the resulting delays associated with rescheduled transmissions may also increase. Thus, the amount of virtual collisions and/or how often (e.g., a frequency and/or a rate) the virtual collisions occur may serve as an indicator of a traffic congestion level in the channel or sidelink resource pool. For instance, if the UE 215 detected a higher number of virtual collisions over a short period of time, the UE 215 may be aware that the channel may be congested. Conversely, if the UE 215 detected a low number of virtual collisions over a long period of time, the UE 215 may be aware that the channel may not be congested. Accordingly, the UE 215 can determine a congestion level in the channel by collecting such virtual collision metrics (e.g., statistics) on the virtual collisions. In some cases, the virtual collision metrics may additionally or alternatively indicate a total quantity or a frequency of virtual collisions. In some aspects, to obtain an accurate view of the traffic congestion level, the UE 215 may also monitor for virtual collisions using measurement-only sensing instead of relying on when the UE has data for transmissions, as will be discussed more fully below.

Figure 6A:
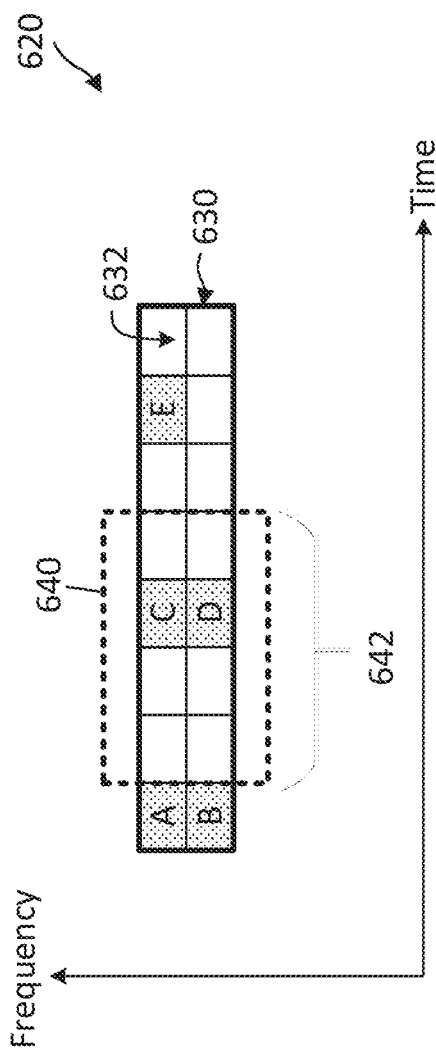
FIG. 6A illustrates a sidelink resource selection scheme that utilizes a contention window according to aspects of the present disclosure.

In some aspects, the UE 215 may utilize virtual collision metrics to adapt to channel congestion and reduce transmission delays. As an illustrative example, the UE 215 may adjust a channel access parameter, such as a contention window size, a transmission power level, a retransmission limit (e.g., a maximum number of retransmissions), traffic profile shaping (e.g., via a CR limit), and/or the like, based on virtual collision metrics. The contention window size (e.g., contention window duration) may refer to a duration where the UE 215 may select a sidelink resource. For example, in some aspects, the UE 215 may apply an effective contention window to the RRA mode-2 sidelink sensing procedure to suppress congestion. FIG. 6A illustrates a sidelink resource selection scheme 620 that utilizes a contention window according to aspects of the present disclosure. The scheme 620 may be implemented by the UE 215 as part of a sidelink resource selection procedure, for example, corresponding to action 318 of the method 300 discussed above in relation to FIGS. 3A-3B. In FIG. 6A, the x-axis represents time in some arbitrary units, and the y-axis represents frequency in some arbitrary units.

In the scheme 620, the UE 215 (at the PHY 304) may identify candidate resources from resources 632 in a resource selection window 630 (e.g., the resource selection window 344), for example, in response to resource selection trigger from the MAC 302. In the illustrated example, the PHY 304 identifies the resources 632 A, B, C, D, E as candidates (available resources not reserved by another device or UE), for example, based on sensing. The PHY 304 may report the candidate resources 632 A-E to the MAC 302. The MAC 302 may perform additional filtering on the set of available resources 632 A-E, for example, to suppress congestion. In this regard, the MAC 302 may apply a contention window 640 to the resource selection window 630, and instead of selecting a resource 632 from the candidate resources 632 A-E reported by the PHY 304, the MAC 302 may select a resource from the candidate resources 632 (e.g., the resource C or resource D) that are within the contention window 640.

As can be observed, the contention window 640 can limit or reduce the number of candidate resources 632 that the UE 215 may select from for a transmission. Accordingly, adjusting the contention window size may affect the duration the UE 215 is permitted to attempt to access a channel for a transmission, as described further below, and may in turn control congestion in the channel.

Figure 6B:
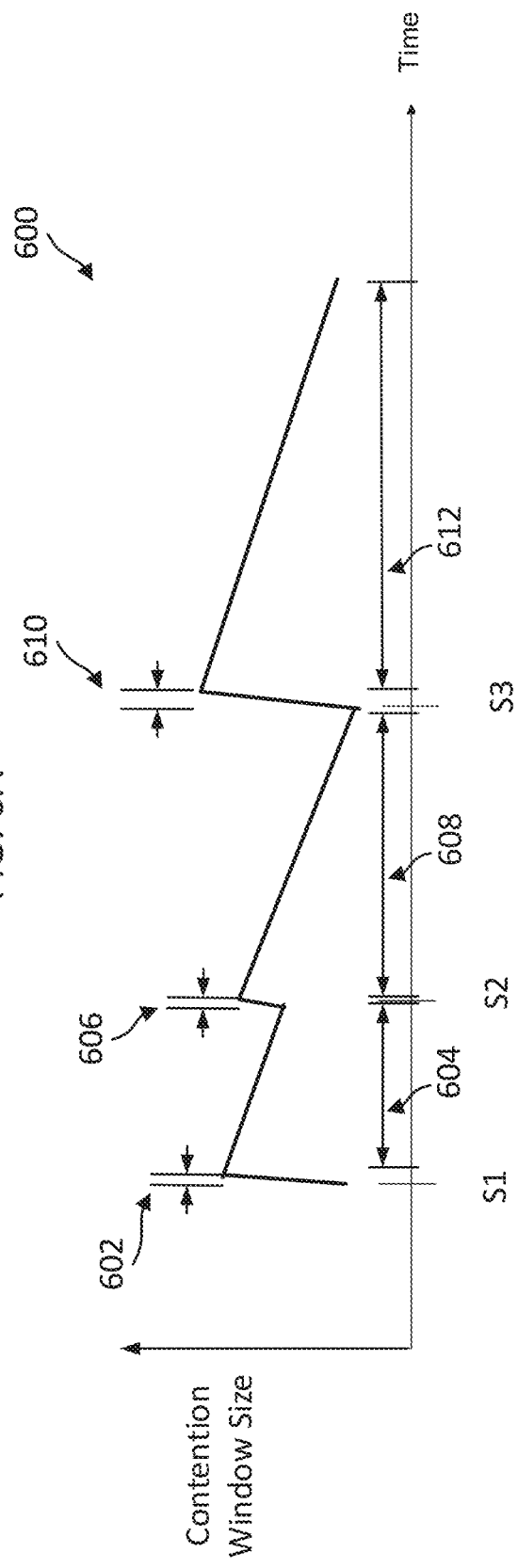
FIG. 6B illustrates a dynamically adjusted contention window size over time according to some aspects of the present disclosure.

FIG. 6B illustrates a plot 600 of a dynamically adjusted contention window size over time. In some aspects, increasing a contention window size (e.g., the duration 642 of the contention window 640) may increase the number of candidate resources that the UE 215 may select from for a transmission, and thus the UE 215 may have increased opportunities to access a channel for transmission. Thus, increasing the contention window size associated with the UE 215 may decrease transmission delays at the UE 215, which may result from virtual collisions. Accordingly, in some aspects, the UE 215 may, in response to failed channel access at the UE 215, increase the contention window size used for transmission from the UE 215. A failed channel access may refer to failing to receive an ACK (e.g., HARQ ACK) for a sidelink transmission (e.g., a PSSCH transmission), receiving a NACK (e.g., HARQ NACK) for a sidelink transmission, an LBT failure, and/or detection of virtual collisions. Utilizing virtual collisions as a metric to adjust contention window size can allow the UE 215 to proactively adapt to channel congestion before an actual transmission failure or an actual collision occur.

For instance, the time S1 may correspond to a first failed channel access attempt by the UE 215, which may result from a virtual collision, a failed LBT attempt, and/or the like. As illustrated, following the first failed channel access attempt at S1 (e.g., within the section 602), the UE 215 increases the contention window size (e.g., via the MAC layer 302). In some aspects, the MAC layer 302 may increase the contention window size in a multiplicative fashion based on virtual collision metrics indicating increasing numbers and/or frequency of failed channel access attempts by the UE 215. For instance, after the first failed channel access attempt (e.g., at time S1), the MAC 302 may double the size of the contention window.

The UE 215 may further be configured to decrease the contention window size based on successful transmissions and/or a lack of channel access attempts by the UE 215. For instance, the UE 215 may decrease the contention window size linearly based on successful channel access attempts. That is, for example, the MAC layer 302 may step the contention window size down by a consistent increment with respect to a certain time interval and/or with respect to each successful channel access attempt. By decreasing the contention window size, the UE 215 may increase the probability of successful channel access for other devices attempting to access the channel. As such, the UE 215 may share access to the channel more fairly.

For instance, in the illustrated plot 600, after increasing the contention window size in response to the failed channel attempt at time S1, the UE 215 may successfully access the channel. As such, the UE 215 may decrease the contention window size (e.g., within the time period 604) until the UE 215 detects a second channel access failure at time S2. With decreasing contention window size associated with the UE 215, channel access increases for other UEs and/or RATs attempting to use the channel.

Plot 600 further illustrates that the UE 215 may continuously adjust the contention window size based on recent channel access attempts. For example, in response to the second channel access failure at time S2, the UE 215 may again increase the contention window size (e.g., within the time period 606). Subsequently, the UE 215 may decrease the contention window size (e.g., within the time period 608). In response to the third channel access failure at time S3, the UE 215 may increase the contention window size once again (e.g., within the time period 610), and the UE 215 may then decrease the contention window size following a successful channel access (e.g., within the time period 612).

While the plot 600 illustrates the UE 215 being responsive to each of the first, second, and third failed channel access attempts (e.g., at time S1, S2, and S3, respectively), aspects are not limited thereto. In some aspects, for example, the UE 215 may filter virtual collision metrics and/or failed channel access attempts and may adjust channel access parameters, such as the contention window size, based on the results of the filtering. For instance, the UE 215 may consider virtual collision metrics within a rolling time window, occurring with a certain frequency, and/or may average virtual collision metrics for a certain time period to determine how to adjust the channel access parameters.

Moreover, in some aspects, the number of channel access attempts, which may correspond to an attempt to perform a transmission, and/or the number of last-minute re-evaluations of resources for transmission by the UE 215 may not be sufficient to determine a relatively reliable virtual collision metric. For instance, in some aspects, the UE 215 may determine the virtual collision metric based on the availability of selected resources. As described above, the selected resources may correspond to resources selected for a transmission (e.g., transmission resources), and the UE 215 may determine the availability based on a last-minute re-evaluation of the selected resources. As such, the number of resources used to determine the virtual collision metric (e.g., the number of virtual collision metric samples) may depend on the number of transmissions made at the UE 215. To that end, relatively few transmissions may result in a virtual collision metric determined based off few samples, while greater transmissions may result in a virtual collision metric determined based off a greater number of samples. In some aspects, the fewer the samples used to determine the virtual collision metric, the more susceptible the virtual collision metric is to the influence of randomness (e.g., sample outliers). In contrast, increasing sample numbers may improve the reliability of the virtual collision metric. Thus, in some aspects, the UE 215 may be configured to determine the virtual collision metric and/or to perform a sidelink transmission based on the virtual collision metric being determined using a number of resources satisfying a predetermined threshold. In this way, the sensitivity of the virtual collision metric to randomness may be tuned.

Additionally or alternatively, in some aspects, the UE 215 may use measurement-only resources to determine the virtual collision metric. That is, for example, the UE 215 may select and determine the availability of resources, for example, by utilizing the same sensing and last-minute re-evaluation procedure as disused above. However, the UE 215 will refrain from using the measurement-only resources for a transmission, regardless of the availability of the resources. In this way, the UE 215 may increase the number of samples used to determine the virtual collision metric within a duration instead of relying on the number of transmissions made at the UE 215. As described in greater detail below, the UE 215 may exclusively use measurement-only resources to determine the virtual collision metric (e.g., the UE 215 may perform measurement-only sensing as shown in FIG. 7) and/or the UE 215 may use measurement-only resources along with transmission resources to determine the virtual collision metric (shown in FIG. 8).

Figure 7:
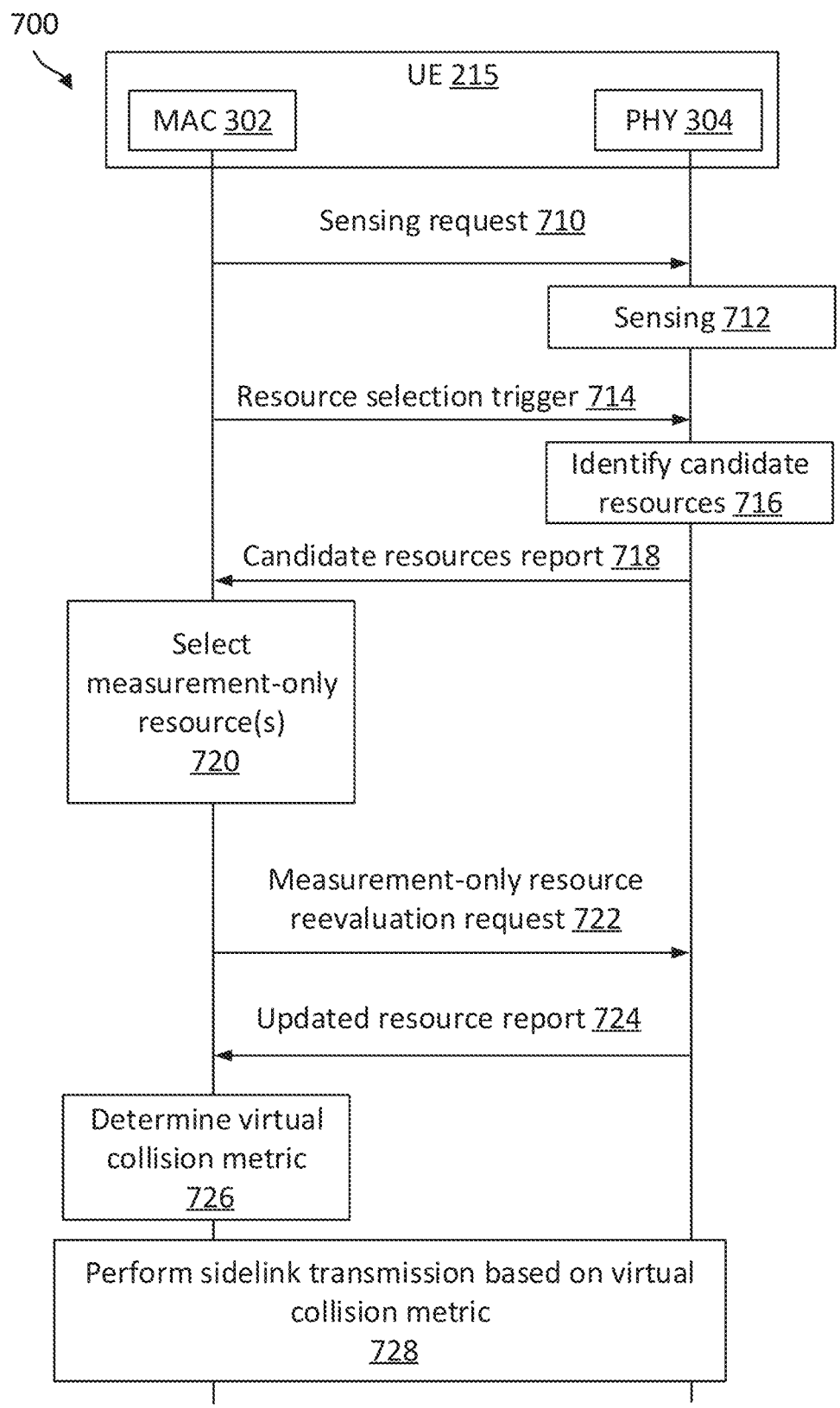
FIG. 7 is a sequence diagram of a virtual collision-based channel access method associated with the use of measurement-only resources according to some aspects of the present disclosure.

FIG. 7 is a sequence diagram illustrating a virtual collision-based channel access method 700 that is associated with a virtual collision metric determined based on measurement-only resources, according to some aspects of the present disclosure. The method 700 may be implemented by a UE 215, for example, utilizing components as discussed below with respect to the UE 1200 of FIG. 12. As illustrated, the method 700 includes a number of enumerated actions, but aspects of the method 700 may include additional actions before, after, and in between the enumerated actions. In some aspects, one or more of the enumerated actions may be omitted or performed in a different order. At a high level, in the method 700, the UE 215 may perform measurement-only sensing (e.g., reusing RRA mode-2 sidelink sensing) to collect virtual collision statistics and utilize the virtual collision statistics as a metric for channel access optimization.

Generally speaking, the method 700 includes features similar to method 300 in many respects. For example, actions 712, 714, 716, and 718 are similar to actions 310, 312, 314, and 316, respectively. Accordingly, for sake of brevity, details of those steps will not be repeated here.

At action 710, the MAC layer 302 may transmit a sensing request to the PHY 304. The sensing request may be associated with measurement-only sensing. In some aspects, the MAC layer 302 may be configured by the layer 3 (L3) of the UE 215 to perform measurement-only sensing. The L3 layer may refer to an upper layer, such as a network layer at the UE 215. For instance, the L3 may configure the MAC layer 302 to perform measurement-only sensing periodically, semi-periodically, based on an event trigger, or a combination thereof. Accordingly, the MAC 302 may transmit the sensing request to the PHY 304 based on the L3 configuration. In some aspects, the event trigger may include the UE 215 entering a particular geographical zone, such as entering or exiting a coverage area 210. For instance, the UE 215 may be equipped with GPS, which may provide indication of when the UE 215 enter or exit a particular zone. Additionally or alternatively, failing to satisfy a packet delay budget (PDB) for a pre-defined (e.g., a threshold) number of occurrences at the UE 215 may trigger the MAC layer 302 to transmit the sensing request. Further, in some aspects, the event trigger may be based on a number of retransmissions (e.g., HARQ retransmissions), such as a number of retransmissions averaged over a time window, exceeding a threshold and/or an average number of virtual collisions within a time window exceeding a threshold.

At action 712, the PHY layer 304 performs sensing in a sidelink resource pool. The PHY layer 304 may continuously sense or monitor resources in the sidelink resource pool and/or the PHY 304 may sense in the sidelink resource pool in response to the sensing request (e.g., action 710). The sensing operations may include SCI decoding similar to the sensing operations at action 310 of FIG. 3A. The PHY layer 304 may be unaware of the sensing request is associated with the measurement-only sensing.

At action 714, the MAC layer 302 sends a resource selection trigger to the PHY layer 304. In some aspects, the MAC layer 302 may transmit the resource selection trigger based on a MAC packet data unit (PDU) being generated and ready for transmission.

At action 716, the PHY layer 304 identifies candidate resources. The PHY layer 304 may identify the candidate resources based on the sensing (e.g., at action 712) and may further generate a candidate resources report based on the identified candidate resources. Accordingly, at action 718, the PHY layer 304 may transmit a candidate resource report to the MAC layer 302. The report may indicate the time and frequency location information for the candidate resources.

At action 720, the MAC layer 302 selects one or more measurement-only resources from among the candidate resources within the received candidate resource report. For instance, the MAC layer 302 may randomly select a measurement-only resource from the candidate resources for determining a virtual collision metric. In some cases, for example, the UE 215 may use the selected measurement-only resource to determine whether a virtual collision is associated with the resource, as described in greater detail below. To select the measurement-only resource, if the report includes a list of N candidate resources, the MAC layer 302 may draw a random number (e.g., k) between 1 and N and select $k^{th}$ candidate resource, for example. Further, in some instances, the MAC layer 302 may randomly select a second resource from the candidate resources by drawing another random number between 1 and N, for example. The MAC layer 302 may further use the second resource for determining the virtual collision metric. Additionally or alternatively, the MAC layer 302 may select a number of measurement-only resources, and each of the selected measurement-only resources may be used to determine a the virtual collision metric. In some aspects, for example, the UE 215 may be configured with a maximum number of measurement-only resources, and the MAC layer 302 may select the maximum number of measurement-only resources from among the candidate resources, and/or the MAC layer 302 may select each of the available candidate resources as measurement-only resources.

At action 722, the MAC layer 302 sends a measurement-only resource reevaluation request to the PHY layer 304. The measurement-only resource reevaluation request may request the PHY layer 304 to report updated available resources at this time instant to double check whether the previously selected measurement-only resources are still available. The measurement-only resource reevaluation request may be substantially similar to the resource reevaluation request at action 320 of FIG. 3A. Again, the PHY layer 304 may be unaware of the measurement-only resource reevaluation request is associated with measurement-only sensing. In some instances, the MAC layer 302 may send the measurement-only resource reevaluation request slightly before (e.g., 1 symbol, 2 symbols, 3 symbols, 4 symbols, or a slot) a slot boundary of a selected measurement-only resource. For instance, the MAC layer 302 may send the measurement-only resource reevaluation request at T3 duration before the slot boundary of the selected measurement-only resource. As such, the resource reevaluation request can also be referred to as a "last-minute re-evaluation" of the measurement-only resource. Moreover, in some cases, the MAC layer 302 may transmit a measurement-only resource reevaluation request to the PHY layer 304 for each of the selected measurement-only resources. In particular, the MAC layer 302 may transmit a respective measurement-only resource reevaluation request to the PHY layer 304 slightly before a slot boundary of a respective measurement-only resource for each of the selected measurement-only resources. Additionally or alternatively, the MAC layer 302 may transmit a single measurement-only resource reevaluation request to the PHY layer 304, and the PHY layer 304 may reevaluate each of the measurement-only resources based on the same measurement-only resource reevaluation request.

At action 724, based on the measurement-only resource reevaluation request, the PHY layer 304 sends an updated resource report to the MAC layer 302. In the updated resource report, the PHY layer 304 may identify resources that are still available (no reservation from anther UE) at the time instant when the resource reevaluation request is received, as similarly described above at action 322 of FIG. 3A. If a measurement-only resource previously selected by the MAC layer 302 is no longer available, the PHY layer 304 may include an indication in the report. For instance, the report may include a re-selection flag set to 1 for the unavailable measurement-only resource. Moreover, the PHY layer 304 may provide an indication of the availability of each of the selected measurement-only resources. For instance, the PHY layer 304 may, for each of the measurement-only resources, determine whether to set a respective re-selection flag corresponding to the measurement-only resource based on the availability of the measurement-only resource.

At action 726, the MAC layer 302 may determine a virtual collision metric based on the updated resource report received from the PHY layer 304. For instance, a re-selection flag within the updated resource report may correspond to a virtual collision at a particular resource. Accordingly, the MAC layer 302 may determine the virtual collision metric based on the re-selection flags associated with the selected measurement-only resources. In particular, the MAC layer 302 may determine the virtual collision metric based on the total number of virtual collision occurrences (e.g., the number of unavailable measurement-only resources) identified within the updated resource report. Additionally or alternatively, the MAC layer 302 may determine the virtual collision metric based on the total number of virtual collision occurrences averaged over the quantity of selected measurement-only resources and/or averaged over the quantity of resources included within the sensing window (e.g., sensing window 342) and/or resource selection window (e.g., resource selection window 344). Further, in some aspects, the MAC layer 302 may log virtual collisions detected from each measurement-only resource reevaluation, and the UE 215 may further filter the logged virtual collisions to determine the virtual collision metric, as described in greater detail below. The MAC layer 302 may determine various metrics from the recorded or logged virtual collisions. For example, the MAC layer 302 may compute a mean or average value, a median value, a variance, or any suitable statistical measures on the virtual collisions.

At action 728, the UE 215 may perform (e.g., transmit) a sidelink transmission based on the virtual collision metric. The UE 215 may refrain from using the measurement-only resources to perform the sidelink transmission, regardless of whether the measurement-only resources are available. As such, the UE 215 may select one or more resources (e.g., transmission resources) to use for the sidelink transmission. In some aspects, the resource selection and/or transmission of the sidelink transmission may be based on the virtual collision metric. In particular, the UE 215 may determine a channel access parameter (e.g., a transmission parameter) for the sidelink transmission based on the virtual collision metric, and the UE 215 may transmit the sidelink transmission based on the channel access parameter. For instance, the channel access parameter may correspond to a transmission power (e.g., a transmission power level), a maximum number of retransmissions associated with a transmission, a contention window size (the duration 642), and/or a congestion control parameter. As such, the channel access parameter may affect the likelihood that the UE 215 successfully performs the sidelink transmission. For instance, increasing the transmission power used to transmit the sidelink transmission may reduce the risk of interference disrupting the sidelink transmission, increasing the maximum number of retransmissions associated with the sidelink transmission may increase the number of opportunities available to the UE 215 to transmit the sidelink transmission, and, as described above with reference to FIG. 6, increasing the contention window size may improve the likelihood that the sidelink transmission is performed successfully. Moreover, the congestion control parameter may correspond to a CR limit, which regulates channel access. Increasing the CR limit may facilitate increased access to the channel. For instance, an increased percentage of resources within the channel may be utilized.

As explained above, a mapping between CBR and CR may be used to regulate congestion in a channel. However, CBR estimates may not be accurate due to various factors, such as sub-channel signal leakage and/or other RATs sharing the same channel. On the other hand, virtual collision metrics may provide an accurate view of congestion experienced by the UE 215, and thus the UE 215 may optimize channel access or congestion control or perform traffic profile shaping by mapping virtual collision metrics to CR limits. Improvements in congestion control can reduce channel uncertainty or transmission failures, and thus can improve transmission latency and/or communication efficiency. Additionally, virtual collisions are obtained as part of sidelink sensing, and thus may be less complex than estimating CBR. Hence, virtual collision-based channel access or congestion control can also reduce implementation complexity at the UE 215, and may be suitable for low-tier UEs with limited processing capabilities.

Thus, as an illustrative example, for relatively higher virtual collision metrics, which may indicate a relatively higher level of channel congestion, the UE 215 may use a relatively higher transmission power to transmit the sidelink transmission, while for relatively lower virtual collision metrics, which may indicate a relatively lower level of channel congestion, the UE 215 may use a relatively lower transmission power level to transmit the sidelink transmission. Similarly, the UE 215 may increase the maximum number of retransmissions, the contention window size, and/or the CR limit based on a virtual collision metric indicating an increase in channel congestion and may decrease the maximum number of retransmissions, the contention window size, and/or the CR limit based on a virtual collision metric indicating a decrease in channel congestion.

Additionally or alternatively, in some aspects, the UE 215 may determine the channel access parameter based on the quantity of resources (e.g., measurement-only resources) selected to determine the virtual collision metric (e.g., at action 720) satisfying a threshold. For instance, the UE 215 may adjust the channel access parameter in response to the quantity of resources exceeding the threshold and may use a previous and/or default (e.g., predetermined) channel access parameter in response to the quantity of resources failing to exceed the threshold or vice versa. In this way, the UE 215 may determine the channel access parameter based on a minimum number of virtual collision measurements (e.g., associated with the quantity of resources) used to generate the virtual collision metric.

Further, in some aspects, the UE 215 may determine the channel access parameter based on the virtual collision metric satisfying a threshold. For instance, the UE 215 may adjust the channel access parameter in response to the virtual collision metric exceeding the threshold and may use a previous and/or default (e.g., predetermined) channel access parameter in response to the virtual collision metric failing to exceed the threshold or vice versa. Additionally or alternatively, the UE 215 may increase the value of the channel access parameter in response to the virtual collision metric exceeding the threshold and may decrease the value of the channel access parameter in response to the virtual collision metric failing to exceed the threshold or vice versa. In this way, the UE 215 may determine the channel access parameter with a certain sensitivity to changes in the virtual collision metric.

Figure 8:
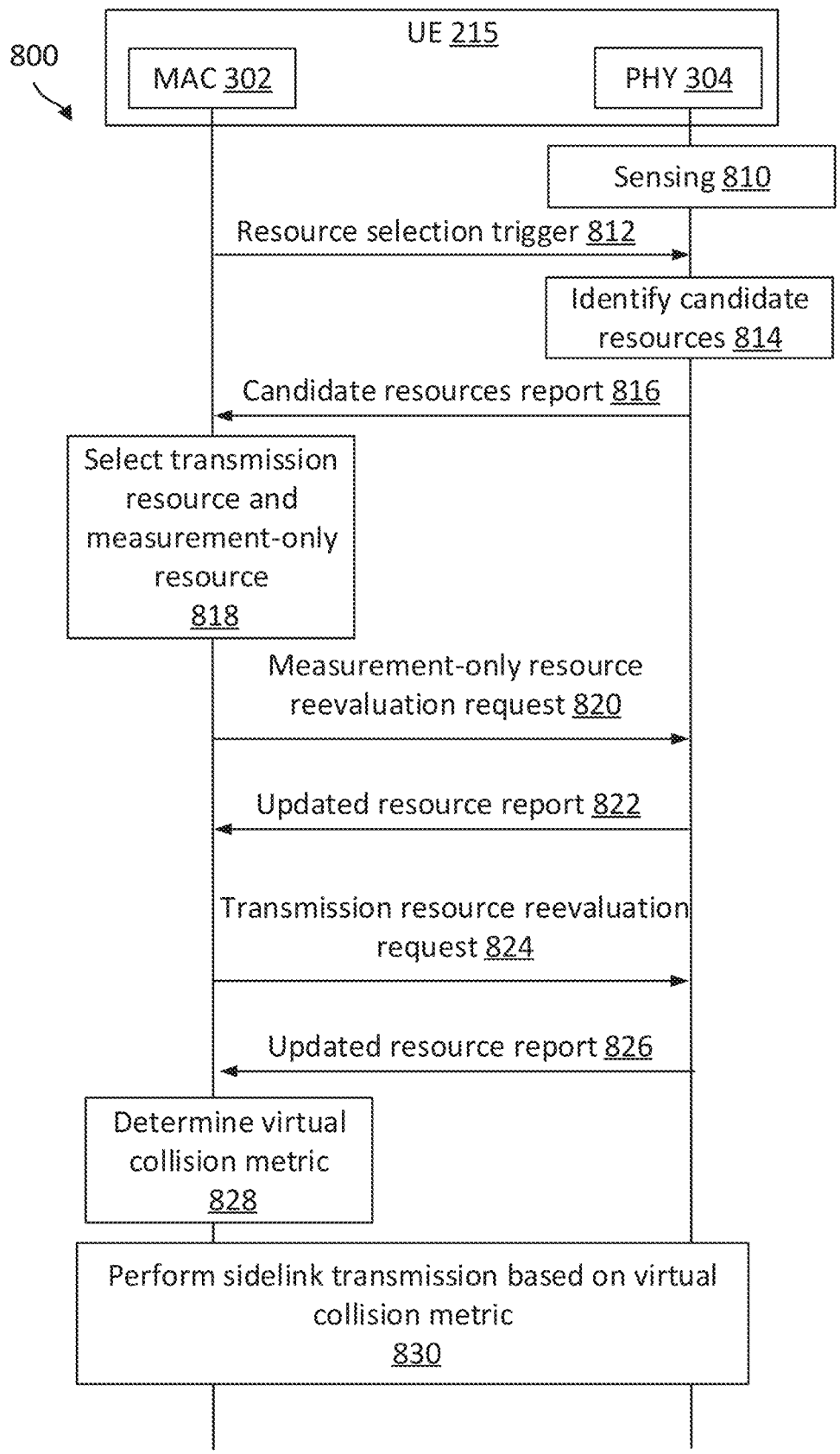
FIG. 8 is a virtual collision-based channel access method associated with the use of a transmission resource and a measurement-only resource according to some aspects of the present disclosure.

FIG. 8 is a sequence diagram illustrating a virtual collision-based channel access method 800 that is associated with a virtual collision metric determined based on both a transmission resource and a measurement-only resource, according to some aspects of the present disclosure. The method 800 may be implemented by a UE 215, for example, utilizing components as discussed below with respect to the UE 1200 of FIG. 12. As illustrated, the method 800 includes a number of enumerated actions, but aspects of the method 800 may include additional actions before, after, and in between the enumerated actions. In some aspects, one or more of the enumerated actions may be omitted or performed in a different order.

Generally speaking, the method 800 includes features similar to method 300 in many respects. For example, actions 810, 812, 814, and 816 are similar to actions 310, 312, 314, and 316, respectively. Accordingly, for sake of brevity, details of those steps will not be repeated here.

At action 810, the PHY layer 304 performs sensing in a sidelink resource pool. The PHY layer 304 may continuously sense or monitor resources in the sidelink resource pool. Further, while not illustrated, the PHY 304 may sense in the sidelink resource pool in response to the sensing request received from the MAC layer 302. For instance, as described above with reference to action 710 of FIG. 7, the MAC layer 302 may be configured (e.g., by the L3) to transmit a sensing request periodically, semi-periodically, and/or in response to an event trigger.

At action 812, the MAC layer 302 sends a resource selection trigger to the PHY layer 304. In some aspects, the MAC layer 302 may transmit the resource selection trigger based on a MAC packet data unit (PDU) being generated and ready for transmission.

At action 814, the PHY layer 304 identifies candidate resources. The PHY layer 304 may identify the candidate resources based on the sensing (e.g., at action 810) and may further generate a candidate resources report based on the identified candidate resources. Accordingly, at action 816, the PHY layer 304 may transmit a candidate resource report to the MAC layer 302. The report may indicate the time and frequency location information for the candidate resources.

At action 818, the MAC layer 302 selects a transmission resource and a measurement-only resource from among the candidate resources within the received candidate resource report. For instance, the MAC layer 302 may randomly select the transmission resource and measurement-only resource from the candidate resources, where the transmission resource may be used by the UE 215 for transmission, if available. As an example, if the candidate resource report includes a list of N candidate resources, the MAC layer 302 may draw a random number (e.g., k) between 1 and N and select $k^{th}$ candidate resource as the transmission resource. Further, in some instances, the MAC layer 302 may randomly select the measurement-only resource from the candidate resources by drawing another random number between 1 and N. Moreover, it may be appreciated that the MAC layer 302 may select any number of transmission resources and/or measurement-only resources from among the candidate resources.

At action 820, the MAC layer 302 sends a measurement-only resource reevaluation request to the PHY layer 304, as similarly described above with reference to action 722 of FIG. 7. At action 822, based on the measurement-only resource reevaluation request, the PHY layer 304 sends an updated resource report to the MAC layer 302. In the updated resource report, the PHY layer 304 may identify resources that are still available at the time instant when the resource reevaluation request is received, as similarly described above at action 322 of FIG. 3A and action 724 of FIG. 7.

At action 824, the MAC layer 302 sends a transmission resource reevaluation request to the PHY layer 304, as similarly described above with reference to action 320 of FIG. 3A. At action 826, based on the transmission resource reevaluation request, the PHY layer 304 sends an updated resource report to the MAC layer 302. In the updated resource report, the PHY layer 304 may identify resources that are still available at the time instant when the resource reevaluation request is received, as similarly described above at action 322 of FIG. 3A and action 724 of FIG. 7.

In some aspects, the transmission of the measurement-only resource re-evaluation request 820 and the transmission resource re-evaluation request 824 to the PHY layer 304 may be performed as separate actions (e.g., action 820 and action 824, respectively) by the MAC layer 302, as illustrated. Additionally or alternatively, the MAC layer 302 may transmit a single resource re-evaluation request to the PHY layer 304, which may prompt the PHY layer 304 to determine the availability of both the measurement-only resource, as well as the transmission resource. In any case, the MAC layer 302 may, at action 828, determine a virtual collision metric based on the availability of the measurement-only resource and the transmission resource. In particular, the MAC layer 302 may determine the virtual collision metric based on the status of a re-selection flag associated with the measurement-only resource and the status of a re-selection flag associated with the transmission resource, which may be included in the same updated resource report or respective updated resource reports (e.g., resource report 822 and resource report 826, respectively). As described herein, the re-selection flags may be set by the PHY layer 304 in response to a detection of a reservation (e.g., obtained from SCI decoding) for the resources (e.g., the unavailability of the resources identified within the last-minute re-evaluation). The re-selection flags may be used by the MAC layer 302 as indication of virtual collisions at the respective resources.

At action 830, the UE 215 may perform (e.g., transmit) a sidelink transmission based on the virtual collision metric. For instance, as described above with reference to action 728 of FIG. 7, the UE 215 may transmit the sidelink transmission based on a channel access parameter, and the UE 215 may determine the channel access parameter based on the virtual collision metric. Further, if the transmission resource is indicated as available within the updated resource report (e.g., at action 826), the UE 215 may perform the sidelink transmission using the transmission resource. Otherwise, the UE 215 may re-select a resource for the transmission of the sidelink transmission.

In some aspects, the UE 215 may employ the method 800 in conjunction with the method 700. For instance, the UE 215 may perform measurement-only sensing to determine virtual collision metrics using the method 700 for a duration of time and may subsequently determine or update virtual collision metrics from measurement-only resources and transmission resources using the method 800. In general, the UE 215 may determine virtual collision metrics from measurement-only resources, transmission resources, or a combination thereof.

Figure 9:
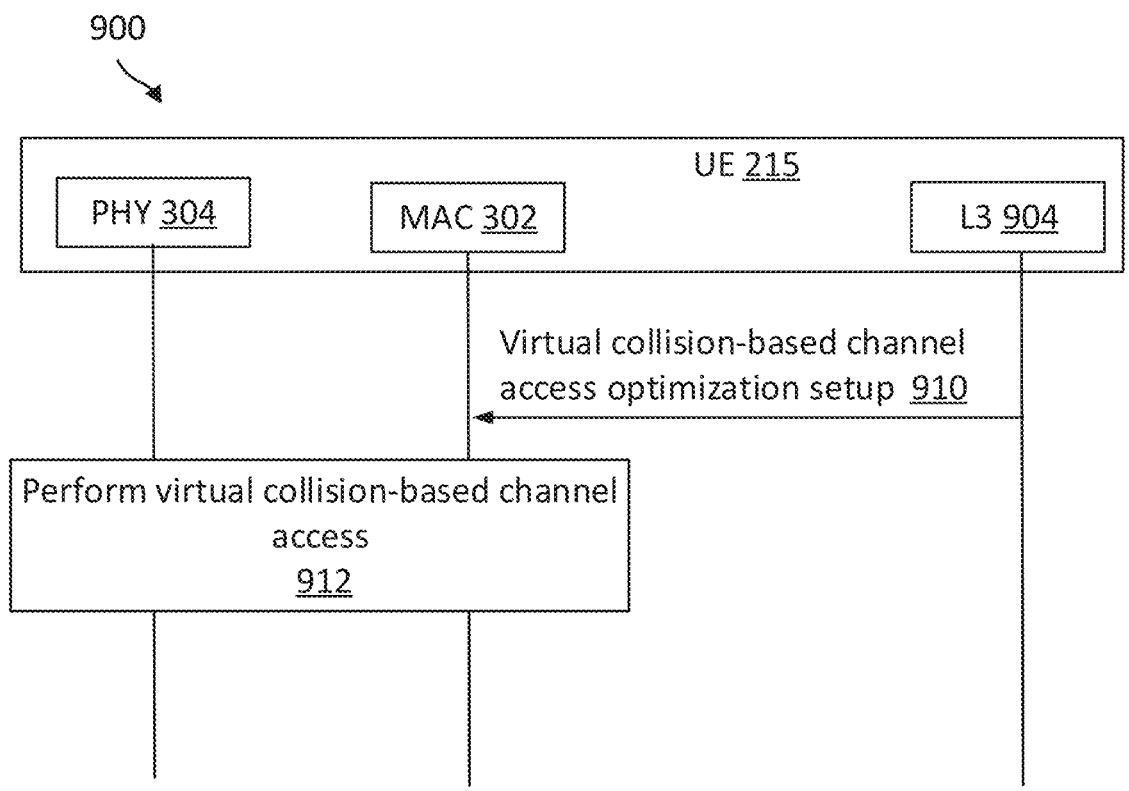
FIG. 9 is a sequence diagram illustrating a method for virtual collision-based channel access optimization configuration according to some aspects of the present disclosure.

FIG. 9 is a sequence diagram illustrating a method 900 for virtual collision-based channel access optimization configuration according to some aspects of the present disclosure. The method 900 may be implemented by a UE 215, for example, utilizing components as discussed below with respect to the UE 1200 of FIG. 12. In particular, the method 900 may be used to configure the MAC layer 302 of the UE 215 to determine and utilize virtual collision metrics, as described herein. As illustrated, the method 900 includes a number of enumerated actions, but aspects of the method 900 may include additional actions before, after, and in between the enumerated actions. In some aspects, one or more of the enumerated actions may be omitted or performed in a different order.

At action 910, the L3 904 of the UE 215 may transmit a virtual collision-based channel access optimization setup to the MAC layer 302 of the UE 215. The L3 904 may refer to the network layer of the UE 215. Further, the virtual collision-based channel access optimization setup may configure the MAC layer 302 to determine and/or to use virtual collision metrics.

For instance, in some aspects, the virtual collision-based channel access optimization setup may configure the MAC layer 302 to determine the virtual collision metrics based on virtual collisions at measurement-only resources. In such cases, the virtual collision-based channel access optimization setup may configure the MAC layer 302 to perform one or more actions of the method 700. In some aspects, the virtual collision-based channel access optimization setup may configure the MAC layer 302 to determine the virtual collision metrics based on virtual collisions at transmission resources. In such cases, the virtual collision-based channel access optimization setup may configure the MAC layer 302 to determine virtual collision metrics based on virtual collisions identified in association with transmission, such as virtual collisions identified based on the updated resource report received at the MAC 302 at action 322 of FIG. 3A. Moreover, in some aspects, the virtual collision-based channel access optimization setup may configure the MAC layer 302 to determine the virtual collision metrics based on a combination of virtual collisions corresponding to transmission resources or measurement-only resources. In such cases, the virtual collision-based channel access optimization setup may configure the MAC layer 302 to perform one or more of actions of the method 800, for example.

In any case, the virtual collision-based channel access optimization setup may configure the MAC layer 302 to determine the virtual collision metrics periodically, semi-periodically, based on an event trigger, or a combination thereof. In some aspects, the event trigger may include the UE 215 entering a particular geographical zone, such as entering or exiting a coverage area 210. Additionally or alternatively, failing to satisfy a packet delay budget (PDB) for a pre-defined (e.g., a threshold) number of occurrences at the UE 215 may trigger the MAC layer 302 to determine the virtual collision metric. The UE 215 may fail to satisfy a PDB when the UE 215 is unable to obtain a resource for transmission within the PDB, for example, due to a higher number of re-selections or failing to identify a candidate within the PDB. Further, in some aspects, the event trigger may be based on a number of retransmissions, such as a number of retransmissions averaged over a time window, exceeding a threshold and/or an average number of virtual collisions within a time window exceeding a threshold.

Further, in some aspects, the L3 904 may, via the virtual collision-based channel access optimization setup, configure the UE 215 with conditions under which the UE 215 may perform virtual-collision based channel access. For instance, the virtual collision-based channel access optimization setup may specify that the UE 215 may not perform virtual-collision based channel access (e.g., that virtual-collision based channel access is not allowed). In such cases, the UE 215 may estimate channel congestion based on CBR measurements, for example. In some cases, the virtual collision-based channel access optimization setup may indicate that virtual-collision based channel access is allowed. In such cases, the UE 215 may decide whether to access a channel based on CBR measurements or perform virtual-collision based channel access. In some instances, the virtual collision-based channel access optimization setup may include a flag indicating whether virtual-collision based channel access is allowed or not allowed. In some cases, the virtual collision-based channel access may be allowed based on a capability of the UE 215. For instance, the virtual collision-based channel access may be allowed for low-capability UEs (e.g., UEs with relatively low-complexity receiver implementations) and may not be allowed for high-capability UEs or other RATs, for example. In some instances, the virtual collision-based channel access optimization setup may include a capability level parameter indicating which UE capability level (e.g., high-capability, mid-capability, low-capability) is allowed to utilize virtual-collision based channel access. Further, in some aspects, the virtual collision-based channel access may be allowed based on the UE 215 being located within specific zones (e.g., geographical locations), such as within certain coverage areas, and/or the UE 215 accessing the channel within a certain time range (e.g., at a particular time of day). In some aspects, the virtual collision-based channel access may be allowed when the UE 215 detects other RATs using the channel. Moreover, the virtual collision-based access may be allowed based on any combination of factors described herein, such as the location of the UE, the capabilities of the UE, the time the channel is accessed, or the detection of other RATs. In some instances, the virtual collision-based channel access optimization setup may include a bitmap, where each bit in the bitmap may correspond to a certain rule or condition for utilizing virtual-collision based channel access and the L3 904 may set or clear a bit to indicate whether the rule or condition is to be satisfied for virtual-collision based channel access.

Additionally or alternatively, the virtual collision-based channel access optimization setup may include one or more of the thresholds described herein. For instance, the virtual collision-based channel access optimization setup may include the maximum number of measurement-only resources to be selected by the MAC layer 302, the threshold number of virtual collision measurements to be used to determine the virtual collision metric, the threshold the virtual collision metric must satisfy or fail to satisfy to determine the channel access parameter, and/or the like. In general, the virtual collision-based channel access optimization setup can be a static configuration, a semi-static configuration, or dynamically updated to allow for flexibility, for example, to adapt to the network traffic load and/or channel conditions.

At action 912, the MAC layer 302 and the PHY layer 304 may perform virtual collision-based channel access. In particular, the UE 215 may perform a transmission (e.g., a sidelink transmission) based on a virtual collision metric determined based on one or more actions performed at the MAC layer 302 and the PHY layer 304. For instance, based on the virtual collision-based channel access optimization setup, the MAC layer 302 and the PHY layer 304 may perform one or more actions of the method 700 or the method 800 to perform the virtual collision-based channel access. Additionally or alternatively, the MAC layer 302 and the PHY layer 304 may perform the virtual collision-based channel access without determining a virtual collision metric based on a measurement-only resource. In some aspects, for example, the MAC layer 302 may select one or more transmission resources, may request a resource re-evaluation of the one or more selected transmission resources, and may determine the virtual collision metric based on the availability of the transmission resources.

Further, in some aspects, the virtual collision-based channel optimization setup may cause the UE 215 (e.g., via the MAC layer 302 and the PHY layer 304) to selectively perform the virtual collision-based channel access based on a virtual collision metric determined using measurement-only resources, based on transmission resources, or based on a combination thereof. That is, for example, the UE 215 may selectively perform actions of the method 700, the method 800, or the UE 215 may determine the virtual collision metric based on transmission resources based on the virtual collision-based channel optimization setup. In particular, the UE 215 may be configured, based on the virtual collision-based channel access optimization setup, to determine the virtual collision metric and/or perform the virtual collision-based channel access based on an optimization of transmission power, an optimization of the maximum number of retransmissions, and/or an optimization of a traffic profile. For instance, determining the virtual collision metric solely based on transmission resources may be relatively inexpensive in terms of power and/or resource consumption at the UE 215. However, the reliability of the virtual collision metric as an indicator of channel congestion may depend in part on the frequency of transmission at the UE 215, as the effect of random virtual collisions in a relatively uncongested channel may decrease with increasing samples (e.g., with a virtual collision metric determined based on increasing transmission resources). On the other hand, determining the virtual collision metric based on transmission and measurement-only resources may be relatively more expensive in terms of power and/or resource consumption at the UE 215 and may be relatively more reliable as an indicator of channel congestion. Moreover, determining the virtual collision metric based on solely measurement-only resources may involve the use of power and resources at the UE 215 exclusively for the determination of the virtual collision metric, as opposed to being used in part for a transmission. Further, because the use of the measurement-only resources may be independent of transmissions at the UE 215, the number of samples included in the virtual collision metric may readily be increased, increasing the reliability of the virtual collision metric.

Moreover, in some cases the virtual collision-based channel optimization setup may cause the UE 215 to perform the virtual collision-based channel access based on a resource pool that the UE 215 attempts to access and/or use for a transmission. For instance, to access a resource pool associated with a channel the UE 215 may be required to verify that a virtual collision metric detected at the UE 215 satisfies a threshold. If the virtual collision metric fails to satisfy the metric, for example, the UE 215 may be denied access to the resource pool. For instance, if the average number of virtual collisions (e.g., within a certain time period and/or associated with a certain number of samples) detected by the UE 215 exceeds a predetermined threshold, the UE 215 may be unable to access the resource pool until the UE 215 adjusts one or more parameters, such as a channel access parameter, and/or detects a virtual collision metric satisfying the threshold, for example. Controlling access or admission to a particular sidelink resource pool based on virtual collision metric can be useful. For example, the UE 215 may be configured with multiple sidelink resource pools with different quality of service (QoS) requirements and a particular sidelink resource pool may have a more stringent QoS requirement than others, for example, to serve ultra-reliable, low-latency communication (URLLC) traffic. As such, controlling access to the particular sidelink resource pool based on a certain virtual collision metric can allow URLLC traffic to meet the latency and/or reliability requirement for URLLC.

Figure 10:
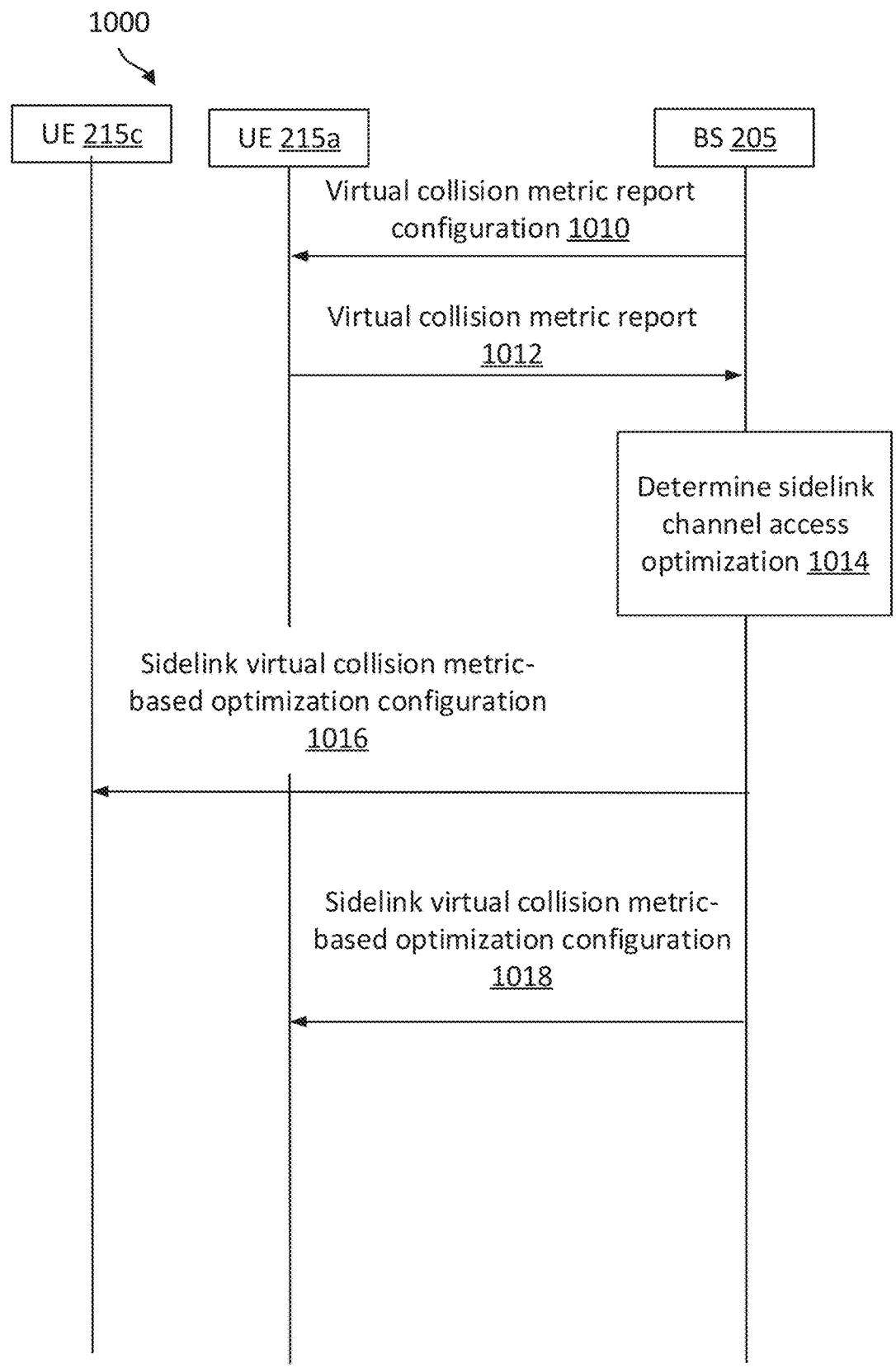
FIG. 10 is a sequence diagram illustrating a method for virtual collision metric reporting configuration according to some aspects of the present disclosure.

FIG. 10 is a sequence diagram illustrating a method 1000 for virtual collision metric reporting configuration according to some aspects of the present disclosure. The method 1000 may be implemented by one or more UEs 215, such as a first UE 215a and a second UE 215c (illustrated in FIG. 2), as well as a BS 205. In particular, the method 1000 may be used to configure a UE 215 (e.g., UE 215*a*) to report virtual collision metrics to the BS 205 and to optimize one or more UEs 215 (e.g., 215*a* and/or 215*c*) based on the reported metrics. Each of the UEs 215*a* and 215*b* may utilize components as discussed below with respect to the UE 1200 of FIG. 12 to implement the method 1000, and the BS 205 may utilize components as discussed below with respect to the BS 1100 of FIG. 11 to implement the method 1000. As illustrated, the method 1000 includes a number of enumerated actions, but aspects of the method 1000 may include additional actions before, after, and in between the enumerated actions. In some aspects, one or more of the enumerated actions may be omitted or performed in a different order.

At action 1010, the BS 205 may transmit a virtual collision metric report configuration to the first UE 215*a*. The virtual collision metric report configuration may cause the first UE 215*a* to report information associated with virtual collision metrics detected by the first UE 215*a* to the BS 205. In particular, the virtual collision metric report configuration may cause the first UE 215*a* to report virtual collision metrics periodically, semi-periodically, or in response to an event (e.g., an event trigger). For instance, the virtual collision metric report configuration may cause the first UE 215*a* to report virtual collision metrics in response to the first UE 215*a* moving locations, a timer elapsing, the virtual collision metrics exceeding a threshold, a change in the report of the virtual collision metrics from a previous report of the virtual collision metrics, and/or the like.

At action 1012, the first UE 215*a* may transmit the virtual collision metric report to the BS 205 in accordance with the virtual collision metric report configuration. That is, for example, the first UE 215*a* may transmit the virtual collision metric report according to the periodicity and/or in response to an event trigger indicated by the virtual collision metric report configuration, as described above. Further, in some aspects, the virtual collision metric report may include an indication of the location of the first UE 215*a*. For instance, the report may include a zone ID, coordinates, and/or global positioning system (GPS) information indicating the location of the UE 215*a*.

In some aspects, the first UE 215*a* may be configured to store a virtual collision log including a record of the number of virtual collisions detected at the first UE 215*a*. The first UE 215*a* may store the virtual collision log at a memory (e.g., the memory 1204) of the first UE 215*a*, for example. As such, the first UE 215*a* may update the virtual collision log over time. In some aspects, the first UE 215*a* may transmit the virtual collision log or a portion thereof as the virtual collision metric report to the BS 205. For instance, the UE 215 may transmit any entries within the virtual collision log that were not previously sent to the BS 205 (e.g., the most recent set of entries in the virtual collision log) within the virtual collision metric report. Additionally or alternatively, the first UE 215*a* may apply a filter to the virtual collision log. For instance, the first UE 215*a* may determine a virtual collision metric based on a quantity of virtual collision occurrences (e.g., entries in the virtual collision log) within a time window, and the first UE 215*a* may transmit an indication of the virtual collision metric to the BS 205 in the virtual collision metric report.

At action 1014, the BS 205 may determine a sidelink channel access optimization based on the virtual collision metric report. In some cases, the sidelink channel access optimization may correspond to a virtual collision-based channel access optimization described above with reference to FIG. 9. For instance, the sidelink channel access optimization may involve an adjustment to the periodicity of the virtual collision-based channel access. More specifically, the sidelink channel access optimization may involve an adjustment to the periodicity of virtual collision measurements and/or channel access parameter adjustments. For instance, the sidelink channel access optimization may specify the thresholds used to determine whether to adjust the channel access parameter based on the virtual collision metric. Additionally or alternatively, the sidelink channel access optimization may involve adjusting a maximum number of measurement-only resources selected by the MAC layer 302 for the measurement of virtual collisions (e.g., via last-minute re-evaluations of the measurement-only resources). To that end, in some aspects, the sidelink channel access optimization may involve enabling (e.g., allowing) the use of measurement-only resources in the determination of a virtual collision metric. For instance, the sidelink channel access optimization may enable a UE 215 to perform one or more actions of the methods 700 or 800.

As an illustrative example, based on a virtual collision metric report indicating a relatively high level of channel congestion (e.g., frequent virtual collisions and/or a quantity of virtual collisions on the channel exceeding a threshold), the sidelink channel access optimization may involve increasing the periodicity of the virtual collision measurements, increasing the periodicity of channel access parameter adjustments (e.g., in response to virtual collision metrics), increasing the maximum number of measurement-only resources, enabling the use of measurement-only resources for virtual collision metrics, or a combination thereof. Similarly, based on a virtual collision metric report indicating a relatively low level of channel congestion (e.g., infrequent virtual collisions and/or a quantity of virtual collisions on the channel falling below a threshold), the sidelink channel access optimization may involve decreasing the periodicity of the virtual collision measurements, decreasing the periodicity of channel access parameter adjustments (e.g., in response to virtual collision metrics), decreasing the maximum number of measurement-only resources, disabling the use of measurement-only resources for virtual collision metrics, or a combination thereof.

Further, in some aspects, the sidelink channel access optimization may involve triggering virtual collision logging at a second UE (e.g., the UE 215*c*). Additionally or alternatively, the sidelink channel access optimization may involve triggering virtual collision-based channel access optimization at the second UE 215*c*. The sidelink channel access optimization may be the same for the first UE 215*a* and the second UE 215*c* or may be different between the two UEs (e.g., UE 215*a* and UE 215*c*).

At action 1016, the BS 205 may transmit a sidelink virtual collision metric-based optimization configuration to the second UE 215*c* based on the sidelink channel access optimization. Similarly, at action 1018, the BS 205 may transmit a sidelink virtual collision metric-based optimization configuration to the first UE 215*a* based on the sidelink channel access optimization. Based on the sidelink channel access optimization the sidelink virtual collision metric-based optimization configuration transmitted to the second UE 215*c* may be the same as or different from the sidelink virtual collision metric-based optimization configuration transmitted to the first UE 215*a*.

In some aspects, a UE 215 may utilize any suitable combinations of the virtual collision metric determination and/or configuration discussed above in relation to FIGS. 4, 5, 6A-6B, 7, 8, 9 and 10.

Figure 11:
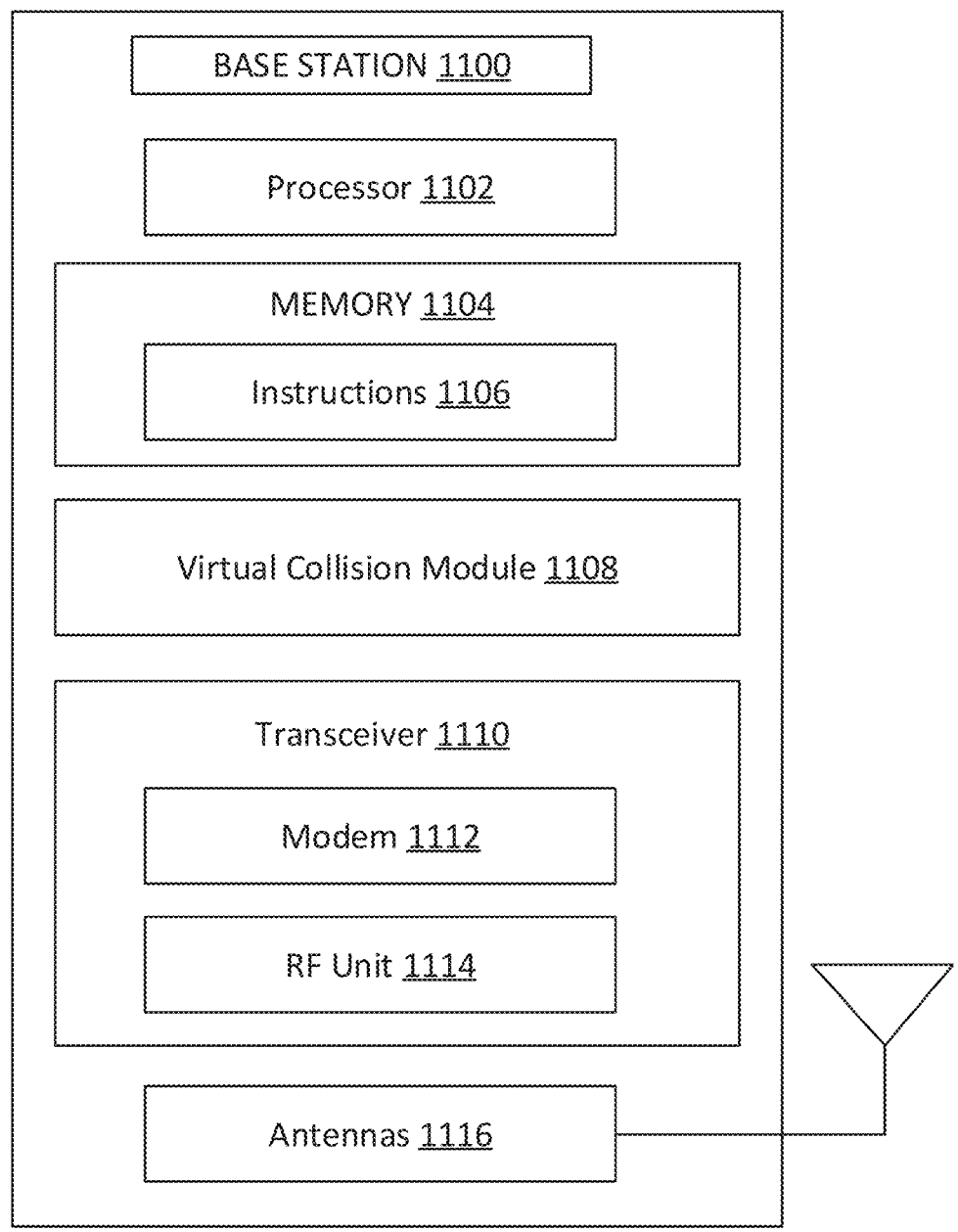
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIG. 1. A shown, the BS 1100 may include a processor 1102, a memory 1104, a virtual collision module 1108, a transceiver 1110 including a modem subsystem 1112 and a RF unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1-2 and 10. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The virtual collision module 1108 may be implemented via hardware, software, or combinations thereof. For example, the virtual collision module 1108 may be implemented as a processor, circuit, and/or instructions 1106 stored in the memory 1104 and executed by the processor 1102. In some examples, the virtual collision module 1108 can be integrated within the modem subsystem 1112. For example, the virtual collision module 1108 can be implemented by a combination of software components (e.g., executed by a DSP or a general processor) and hardware components (e.g., logic gates and circuitry) within the modem subsystem 1112.

The virtual collision module 1108 may communicate with one or more components of the BS 1100 to perform for various aspects of the present disclosure, for example, aspects of FIGS. 1-2 and 10. The virtual collision module 1108 is configured to configure a UE (e.g., the UEs 115, 215) with a sidelink configuration (e.g., a sidelink resource pool 350) for sidelink communications. The virtual collision module 1108 may further be configured to configure the UE with a virtual collision metric report configuration (e.g., action 1010), to determine a sidelink channel access optimization (e.g., action 1012), and/or to configure the UE with a sidelink virtual collision metric-based optimization configuration (e.g., action 1016 and/or action 1018).

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configuration, sidelink resource pool configurations, sidelink virtual collision metric-based optimization configurations) from the modem subsystem 1112 (on outbound transmissions) or of transmissions originating from another source such as a UE 115. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110. The transceiver 1110 may provide the demodulated and decoded data (e.g., virtual collision metric reports) to the virtual collision module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
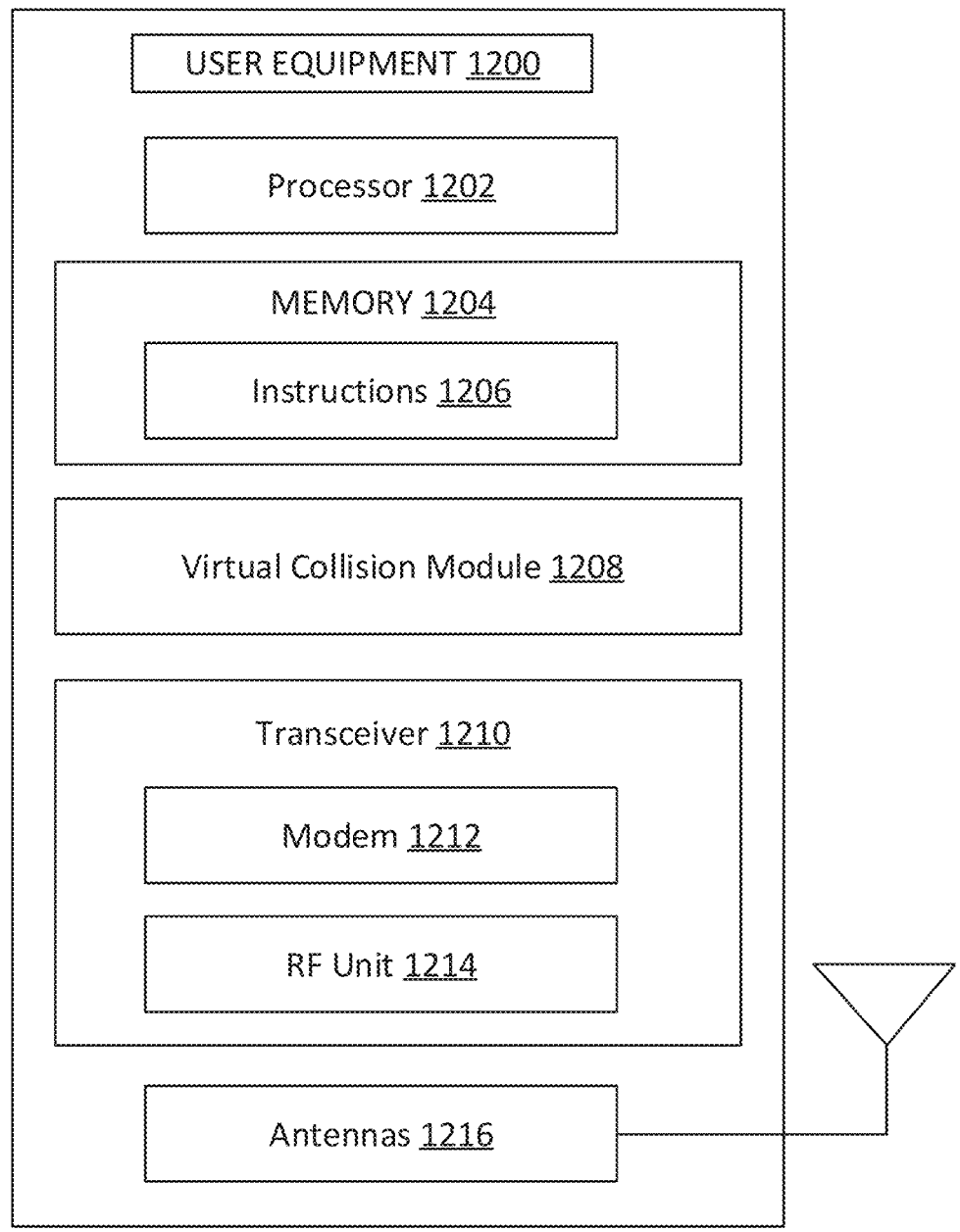
FIG. 12 is a block diagram of an exemplary user equipment (UE) according to some aspects of the present disclosure.

FIG. 12 is a block diagram of an exemplary UE 1200 according to some aspects of the present disclosure. The UE 1200 may be a UE 115 as discussed above with respect to FIG. 1 or a UE 215 as discussed above with respect to FIGS. 2, 3A-3B, 4-10, 13, and 14. As shown, the UE 1200 may include a processor 1202, a memory 1204, a virtual collision module 1208, a transceiver 1210 including a modem subsystem 1212 and a radio frequency (RF) unit 1214, and one or more antennas 1216. These elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UEs 115 and/or 215 in connection with aspects of the present disclosure, for example, aspects of FIGS. 2, 3A-3B, 4-10, 13, and 14. Instructions 1206 may also be referred to as program code, which may be interpreted broadly to include any type of computer-readable statement(s) as discussed above with respect to FIG. 12.

The virtual collision module 1208 may be implemented via hardware, software, or combinations thereof. For example, the virtual collision module 1208 may be implemented as a processor, circuit, and/or instructions 1206 stored in the memory 1204 and executed by the processor 1202. In some examples, the virtual collision module 1208 can be integrated within the modem subsystem 1212. For example, the virtual collision module 1208 can be implemented by a combination of software components (e.g., executed by a DSP or a general processor) and hardware components (e.g., logic gates and circuitry) within the modem subsystem 1212.

The virtual collision module 1208 may communicate with one or more components of the UE 1200 to perform for various aspects of the present disclosure, for example, aspects of FIGS. 3A-3B, 4-10, 13, and 14. In some aspects, the virtual collision module 1208 is configured to determine a virtual collision metric based on the availability of one or more resources, as discussed with respect to FIGS. 4-10, 13, and 14.

The virtual collision module 1208 is further configured to sense in a sidelink resource pool. The sensing or monitoring may include decoding SCI and/or measuring signal energy in the channel. The virtual collision module 1208 may be configured to blindly decode SCI from a PSCCH of each resource, record the decoded SCI upon a successful decoding, determine a signal measurement (e.g., RSRP and/or a RSSI) for each resource, and record the signal measurements.

The virtual collision module 1208 is further configured to select one or more resources, such as measurement-only resources and/or transmission resources based on the sensing. The virtual collision module 1208 may determine the virtual collision metric based on the availability of the one or more selected resources. For instance, the virtual collision module 1208 may request and/or perform a last-minute re-evaluation of each of the selected resources, and the virtual collision module 1208 may determine the availability of the resources based on the status of re-selection flags associated with the resources. The virtual collision module 1208 may be further configured to adjust and/or determine a channel access parameter based on the virtual collision metric.

As shown, the transceiver 1210 may include the modem subsystem 1212 and the RF unit 1214. The transceiver 1210 can be configured to communicate bi-directionally with other devices, such as the BSs 105. The modem subsystem 1212 may be configured to modulate and/or encode the data from the memory 1204 and/or the virtual collision module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., PSCCH SCI, PSSCH data, virtual collision metric report) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may include one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., RRC configurations, sidelink resource pools configurations, PSCCH SCI, PSSCH data, sidelink virtual collision metric-based optimization configurations) to the virtual collision module 1208 for processing. The antennas 1216 may include multiple antennas of similar or different designs in order to sustain multiple transmission links. The RF unit 1214 may configure the antennas 1216.

In some aspects, the processor 1202 is configured to communicate with one or more components of the UE 1200 to select a plurality of resources from a sidelink resource pool, request an evaluation of an availability of the plurality of resources, and receive an indication of the availability of the plurality of resources. In some aspects, the processor 1202 is configured to communicate with one or more components of the UE 1200 to perform measurement-only sensing in a sidelink resource pool. In particular, the processor 1202 may be configured to select a plurality of measurement-only resources from the sidelink resource pool and to obtain an availability of the plurality of measurement-only resources.

The transceiver 1210 may be configured to communicate with one or more components of the UE 1200 to transmit, based on a virtual collision metric associated with the indication of the availability of the plurality of resources, a first sidelink transmission. The transceiver 1210 may be configured to transmit, based on a virtual collision metric associated with an availability of the plurality of measurement-only resources obtained from the measurement-only sensing, a first sidelink transmission.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
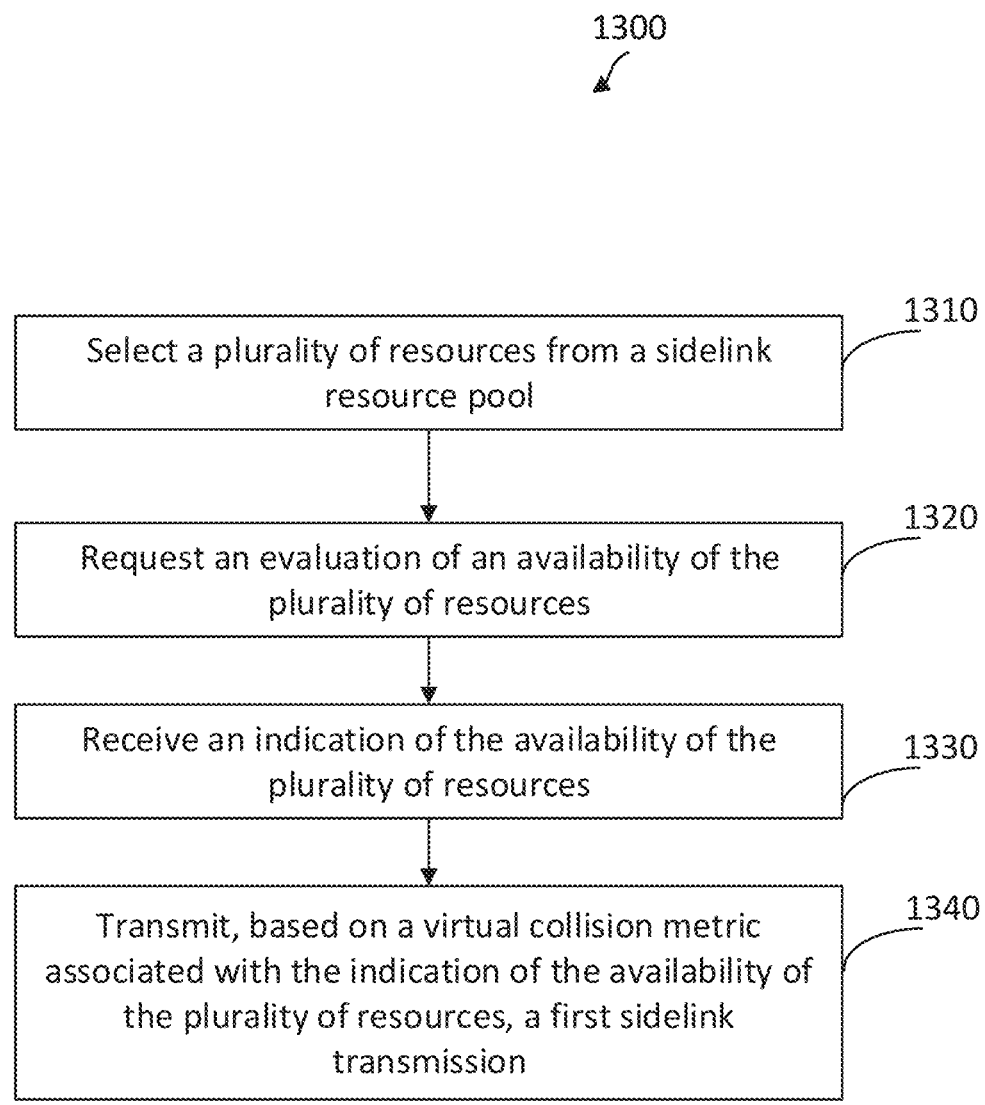
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as a UE 115, 215, 1200 may utilize one or more components, such as the processor 1202, the memory 1204, the virtual collision module 1208, the transceiver 1210, the modem 1212, and the one or more antennas 1216, to execute the steps of method 1300. The method 1300 may employ similar mechanisms as described above in FIGS. 3A-3B, 4, 5, 6, 7, 8, A-9, and 10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a UE may select a plurality of resources form a sidelink resource pool. For instance, the UE may, via a PHY layer (e.g., the PHY layer 304), sense in the sidelink resource pool, as described above with reference to action 310 of FIG. 3, action 712 of FIG. 7, and action 810. Based on the sensing, the UE may select (e.g., via a MAC layer) one or more candidate resources that are available, as described above with reference to action 318 of FIG. 3, action 720 of FIG. 7, and action 818 of FIG. 8. In some aspects, the selected resources may be transmission resources, measurement-only resources, or a combination thereof. Further, the sidelink resource pool may be in a licensed based and/or in an unlicensed band. Moreover, the UE may select the plurality of resources based on a resource selection trigger. In some aspects, the UE may utilize one or more components, such as the processor 1202, the memory 1204, the virtual collision module 1208, the transceiver 1210, the modem 1212, and the one or more antennas 1216, to perform the operations at block 1310.

At block 1320, the UE may request an evaluation of an availability of the plurality of resources. For instance, the UE may request, via a MAC layer (e.g., the MAC layer 302) a resource re-evaluation (e.g., a last-minute re-evaluation) of the plurality of resources, as described with reference to action 320 of FIG. 3A, action 722 of FIG. 7, and actions 820 and 824 of FIG. 8. In some aspects, the UE may request the evaluation of each of the availability of the plurality of resources with a single resource re-evaluation request. For instance, the UE may simultaneously request the evaluation of both a first and a second resource. In some aspects, the UE may transmit a first evaluation request for the first resource at a first time and may transmit a second evaluation request for the second resource at a second time. In some aspects, for example, the first resource may be a measurement-only resource, and the second resource may be a transmission resource. In some aspects, the UE may utilize one or more components, such as the processor 1202, the memory 1204, the virtual collision module 1208, the transceiver 1210, the modem 1212, and the one or more antennas 1216, to perform the operations at block 1320.

At block 1330, the UE may receive an indication of the availability of the plurality of resources. For instance, the UE may receive, from a PHY layer (e.g., the PHY layer 304) an updated resource report, as described with reference to action 322 of FIG. 3A, action 724 of FIG. 7, and actions 822 and 826 of FIG. 8. The updated resource report may indicate whether a resource is available or unavailable based on the last-minute re-evaluation of the resource. In particular, if a resource is unavailable, the UE may receive a re-selection flag associated with the resource. Otherwise, the UE may receive an indication that the resource is available. As an illustrative example, the re-selection flag associated with an available resource may not be set. In some aspects, the UE may utilize one or more components, such as the processor 1202, the memory 1204, the virtual collision module 1208, the transceiver 1210, the modem 1212, and the one or more antennas 1216, to perform the operations at block 1330.

At block 1340, the UE may transmit, based on a virtual collision metric associated with the indication of the availability of the plurality of resources, a first sidelink transmission. The UE may transmit the first sidelink transmission using resources in the sidelink resource pool. As described herein, the indication of a resource being unavailable (e.g. a resource re-selection flag) may correspond to a virtual collision at the resource between the UE and another wireless communication device that previously reserved the resource. Accordingly, in some aspects, the UE may determine the virtual collision metric based on the indication of one or more unavailable resources in the indication of the availability of the plurality of resources. In particular, the UE may determine the virtual collision metric based on a quantity of resources indicated as unavailable (e.g., a number of virtual collisions) in the indication of the availability of the plurality of resources. The UE may further determine the virtual collision metric based on storing a virtual collision log with a record of the unavailable resources. For instance, the UE may store the virtual collision log within memory (e.g., memory 1204) and may update the virtual collision log over time. In some aspects, the UE may apply a filter to the virtual collision log and may determine the virtual collision metric further based on the filtered virtual collision log. In some aspects, for example, the UE may filter the virtual collision log based on moving (e.g., rolling) time window, may average virtual collisions over last-minute re-evaluations of resources, and/or the like. In some aspects, the UE may utilize one or more components, such as the processor 1202, the memory 1204, the virtual collision module 1208, the transceiver 1210, the modem 1212, and the one or more antennas 1216, to perform the operations at block 1340.

In some aspects, the UE may perform the first sidelink transmission based on the virtual collision metric satisfying a threshold. For example, the UE may determine that a frequency of virtual collisions within a time window falls below a certain threshold, a ratio of virtual collisions to resources that remained available during the last-minute re-evaluation falls below a predetermined threshold, and/or the like. Additionally or alternatively, the UE may determine a channel access parameter for the first sidelink transmission based on the virtual collision metric, and the UE may transmit the first sidelink transmission in accordance with the channel access parameter. The channel access parameter may be associated with a transmission power for the first sidelink transmission, a maximum number of retransmissions, a contention window size, a congestion control parameter (e.g., a CR limit), and/or the like. In some aspects, the UE may further determine the channel access parameter based on a virtual collision logging period satisfying a threshold. In particular, the UE may determine the channel access parameter based on the number of entries (e.g., virtual collision metrics and/or virtual collision measurements) and/or a time period spanned by entries of a virtual collision log satisfying the threshold. To that end, the UE may log virtual collision metrics to satisfy a requirement to access a channel and/or a resource pool.

Further, in some aspects, performing the first sidelink transmission at block 1340 may involve the UE selecting, based on a congestion control, a second resource from the sidelink resource pool for the first sidelink transmission and determining, based on a configuration, to utilize the virtual collision metric for the congestion control. That is, for example, the UE may use the virtual collision metric for congestion control in addition to or as an alternative of congestion control based on a CBR measurement. As described herein, the UE may use the virtual collision metric for congestion control based on a configuration of the MAC layer by an L3 (e.g., L3 904) and/or based on a configuration received from a BS (e.g., BS 205). Moreover, the UE may be configured to select the second resource in response to determining, based on a last-minute re-evaluation, that the first resource is unavailable (e.g., in response to identifying a virtual collision at the first resource).

In some aspects, the UE may further transmit a report indicating the virtual collision metric to the BS. The UE may transmit the report based on a reporting periodicity and/or based on a reporting trigger. The reporting periodicity and/or the reporting trigger may be configured at the UE by the BS. For instance, the UE may receive a configuration for reporting the virtual collision metric from the BS, as described above with reference to FIG. 10.

Figure 14:
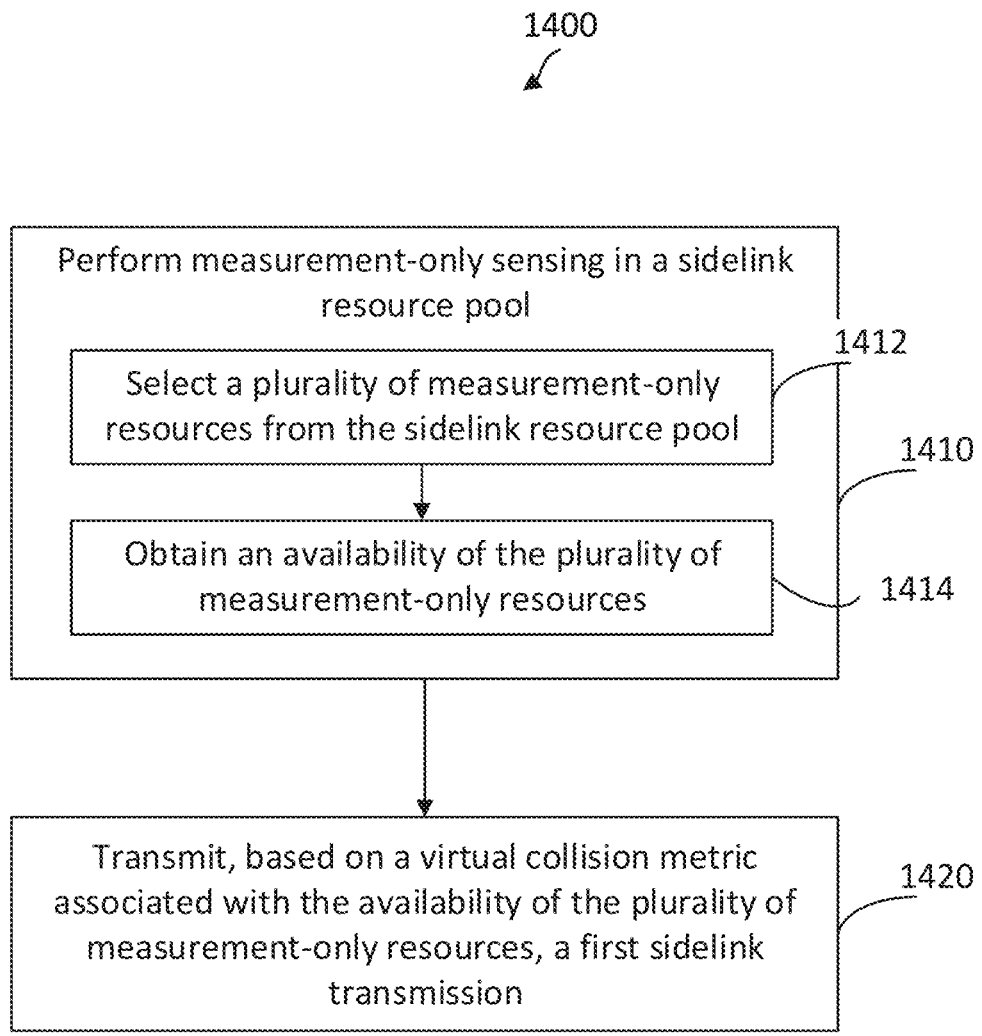
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as a UE 115, 215, 1200 may utilize one or more components, such as the processor 1202, the memory 1204, the virtual collision module 1208, the transceiver 1210, the modem 1212, and the one or more antennas 1216, to execute the steps of method 1400. The method 1400 may employ similar mechanisms as described above in FIGS. 3A-3B, 4, 5, 6, 7, 8, 9, 10, and 13. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a UE may perform measurement-only sensing in a sidelink resource pool. In some aspects, performing measurement-only sensing in the sidelink resource pool may involve selecting a plurality of measurement-only resources from the sidelink resource pool (e.g., at sub-block 1412) and obtaining an availability of the plurality of measurement-only resources (e.g., at sub-block 1414). For instance, the UE may select the plurality of measurement-only resources as described above with reference to action 720 of FIG. 7, and the UE may obtain the availability of the plurality of measurement-only resources by requesting an evaluation of the availability of the plurality of measurement-only resources. The UE may further obtain the availability of the plurality of measurement-only resources by receiving an indication of the availability of the plurality of measurement-only resources. In particular, the UE may request, at a MAC layer, a last-minute re-evaluation of the plurality of measurement-only resources, and the UE may, at a PHY layer, generate an updated resource report indicating the availability of the plurality of measurement-only resources based on the last-minute evaluation. In some aspects, the UE may utilize one or more components, such as the processor 1202, the memory 1204, the virtual collision module 1208, the transceiver 1210, the modem 1212, and the one or more antennas 1216, to perform the operations at block 1410.

In some aspects, the UE may perform the measurement-only sensing based on a measurement-only sensing configuration. The measurement-only sensing configuration may include an indication of periodicity, in some aspects. As such, the UE may select the plurality of measurement-only resources (at sub-block 1412) based on the periodicity. Additionally or alternatively, the measurement-only sensing configuration may include an indication of an event associated with at least one of a geographical zone, a missed packet delay budget (PDB), and/or a virtual collision metric threshold, and the UE may select the plurality of measurement-only resources based on a detection of the indicated event. Moreover, in some aspects, the UE may receive the measurement-only sensing configuration at the MAC layer. For instance, the MAC layer may receive the measurement-only sensing configuration from the L3. Further, the UE may receive the measurement-only sensing configuration from a BS, in some aspects.

At block 1420, the UE may transmit, based on a virtual collision metric associated with the availability of the plurality of measurement-only resources, a first sidelink transmission. The UE may transmit the first sidelink transmission using resources in the sidelink resource pool. As described herein, the UE may refrain from using the measurement-only resources for transmission. Thus, the UE may perform the first sidelink transmission using a different resource selected from the sidelink resource pool. For instance, in some aspects, the UE may select the resource for the first sidelink transmission based on the virtual collision metric. In some aspects, the UE may utilize one or more components, such as the processor 1202, the memory 1204, the virtual collision module 1208, the transceiver 1210, the modem 1212, and the one or more antennas 1216, to perform the operations at block 1420.

Further aspects of the present disclosure include the following:

1. A method of wireless communication performed by a user equipment (UE), the method comprising:
   selecting a plurality of resources from a sidelink resource pool;
   requesting an evaluation of an availability of the plurality of resources;
   receiving an indication of the availability of the plurality of resources; and
   transmitting, based on a virtual collision metric associated with the indication of the availability of the plurality of resources, a first sidelink transmission.

2. The method of clause 1, wherein:
   the receiving the indication of the availability of the plurality of resources comprises:
      receiving an indication that one or more resources of the plurality of resources is unavailable; and
   the method further comprises:
      determining the virtual collision metric based on the indication that the one or more resources is unavailable.

3. The method of clause 2, further comprising:
   storing a virtual collision log including a record of a number of the one or more unavailable resources.

4. The method of clause 3, wherein the determining the virtual collision metric further comprises:
   applying a filter to the virtual collision log.

5. The method of any of clauses 1-4, wherein a first resource of the plurality of resources is a measurement-only resource.

6. The method of any of clauses 1-4, wherein the selecting the plurality of resources comprises:
selecting a first resource and a second resource of the plurality of resources based on a resource selection trigger, the first resource being a measurement-only resource, and the second resource being a transmission resource to be used for a sidelink transmission.

7. The method of clause 6, wherein the requesting the evaluation of the plurality of resources comprises:
transmitting, at a first time instant, a first evaluation request for the measurement-only resource; and
transmitting, at a second time instant different from the first time instant, a second evaluation request for the second resource.

8. The method of any of clauses 1-7, wherein the transmitting the first sidelink transmission based on the virtual collision metric further comprises:
determining, based on the virtual collision metric, a channel access parameter for the first sidelink transmission.

9. The method of clause 8, wherein the channel access parameter is a transmission power for the first sidelink transmission.

10. The method of clause 8, wherein the channel access parameter is a maximum number of retransmissions.

11. The method of clause 8, wherein the channel access parameter is a contention window size.

12. The method of clause 8, wherein the channel access parameter is a congestion control parameter.

13. The method of clause 8, wherein the determining the channel access parameter comprises:
determining the channel access parameter based on a virtual collision logging period satisfying a threshold.

14. The method of clause 8, wherein the determining the channel access parameter comprises:
determining the channel access parameter based on a quantity of the plurality of resources selected for determining the virtual collision metric satisfying a threshold.

15. The method of clause 8, wherein the determining the channel access parameter comprises:
determining the channel access parameter based on the virtual collision metric satisfying a threshold.

16. The method of any of clauses 1-14, wherein the transmitting the first sidelink transmission based on the virtual collision metric comprises:
transmitting the first sidelink transmission based on the virtual collision metric satisfying a threshold.

17. The method of any of clauses 1-16, wherein the transmitting the first sidelink transmission based on the virtual collision metric comprises:
selecting, based on a congestion control, a second resource from the sidelink resource pool for the first sidelink transmission; and
determining, based on a configuration, to utilize the virtual collision metric for the congestion control.

18. The method of clause 17, wherein the configuration includes an indication indicating whether utilizing the virtual collision metric for the congestion control is allowed.

19. The method of clause 17, wherein the configuration includes an indication indicating that utilizing the virtual collision metric for the congestion control is allowed based on at least one of a capability of the UE, a zone associated with the UE, a time period associated with the congestion control, or a detection of a radio access technology (RAT) different from a RAT of the UE.

20. The method of any of clauses 1-19, further comprising:
transmitting, to a base station (BS), a report indicating the virtual collision metric.

21. The method of clause 20, wherein the transmitting the report for the virtual collision metric is further based on a reporting periodicity.

22. The method of clause 20, wherein the transmitting the report for the virtual collision metric is further based on a reporting trigger.

23. A method of wireless communication performed by a user equipment (UE), the method comprising:
performing measurement-only sensing in a sidelink resource pool, wherein the performing the measurement-only sensing comprises:
selecting a plurality of measurement-only resources from the sidelink resource pool; and
obtaining an availability of the plurality of measurement-only resources; and
transmitting, based on a virtual collision metric associated with the availability of the plurality of measurement-only resources obtained from the measurement-only sensing, a first sidelink transmission.

24. The method of clause 23, wherein:
the obtaining the availability of the plurality of measurement-only resources comprises:
requesting an evaluation of the availability of the plurality of measurement-only resources; and
receiving an indication that one or more resources of the plurality of measurement-only resources is unavailable, wherein the virtual collision metric is based on a number of the one or more unavailable resources.

25. The method of any of clauses 23-24, wherein the performing the measurement-only sensing is based on a measurement-only sensing configuration.

26. The method of clause 25, wherein the measurement-only sensing configuration includes an indication of a periodicity, and wherein the selecting the plurality of measurement-only resources is further based on the periodicity.

27. The method of clause 25, wherein the measurement-only sensing configuration includes an indication of an event associated with at least one of a geographical zone, a missed packet delay budget, or a virtual collision metric threshold, and wherein the selecting the plurality of measurement-only resources is further based on a detection of the event.

28. A user equipment (UE) comprising:
a processor configured to:
select a plurality of resources from a sidelink resource pool;
request an evaluation of an availability of the plurality of resources; and
receive an indication of the availability of the plurality of resources; and
a transceiver in communication with the processor, the transceiver configured to:
transmit, based on a virtual collision metric associated with the indication of the availability of the plurality of resources, a first sidelink transmission.

29. The UE of clause 28, wherein:
the processor configured to receive the indication of the availability of the plurality of resources is further configured to:
receive an indication that one or more resources of the plurality of resources is unavailable; and determine the virtual collision metric based on the indication that the one or more resources is unavailable.

30. A user equipment (UE) comprising:
a processor configured to:
perform measurement-only sensing in a sidelink resource pool, wherein the processor configured to perform the measurement-only sensing is further configured to:
select a plurality of measurement-only resources from the sidelink resource pool; and
obtain an availability of the plurality of measurement-only resources; and
a transceiver in communication with the processor, the transceiver configured to:
transmit, based on a virtual collision metric associated with the availability of the plurality of measurement-only resources obtained from the measurement-only sensing, a first sidelink transmission.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
selecting a plurality of resources from a sidelink resource pool based on a first measurement of an availability of resources within the sidelink resource pool at a first time;
performing a second measurement of an availability of the selected plurality of resources at a second time after the first time;
storing a first virtual collision indication in a virtual collision log based on the second measurement, the virtual collision log including a plurality of virtual collision indications;
applying, based on a time window, a filter to the virtual collision log to provide a filtered virtual collision metric; and
transmitting, based on the filtered virtual collision metric:
a first sidelink transmission using different resources than the selected plurality of resources, and
a transmission parameter.

2. The method of claim 1, wherein the applying the filter to the virtual collision log comprises:
determining a quantity of virtual collision occurrences within the time window.

3. The method of claim 1, wherein a first resource of the plurality of resources is a measurement-only resource.

4. The method of claim 1, wherein the selecting the plurality of resources comprises:
selecting a first resource and a second resource of the plurality of resources based on a resource selection trigger, the first resource being a measurement-only resource, and the second resource being a transmission resource to be used for the first sidelink transmission.

5. The method of claim 4, further comprising:
transmitting, at a first time instant, a first evaluation request for the measurement-only resource; and
transmitting, at a second time instant different from the first time instant, a second evaluation request for the second resource.

6. The method of claim 1, wherein the transmitting the first sidelink transmission based on the filtered virtual collision metric further comprises:
determining, based on the filtered virtual collision metric, a channel access parameter for the first sidelink transmission.

7. The method of claim 6, wherein the channel access parameter is a transmission power for the first sidelink transmission.

8. The method of claim 6, wherein the channel access parameter is a maximum number of retransmissions.

9. The method of claim 6, wherein the channel access parameter is a contention window size.

10. The method of claim 6, wherein the channel access parameter is a congestion control parameter.

11. The method of claim 6, wherein the determining the channel access parameter comprises:
determining the channel access parameter based on a virtual collision logging period satisfying a threshold.

12. The method of claim 6, wherein the determining the channel access parameter comprises:
    determining the channel access parameter based on a quantity of the plurality of resources selected for determining the filtered virtual collision metric satisfying a threshold.

13. The method of claim 6, wherein the determining the channel access parameter comprises:
    determining the channel access parameter based on the filtered virtual collision metric satisfying a threshold.

14. The method of claim 1, wherein the transmitting the first sidelink transmission comprises:
    transmitting the first sidelink transmission based on the filtered virtual collision metric satisfying a threshold.

15. The method of claim 1, wherein the transmitting the first sidelink transmission comprises:
    selecting, based on a congestion control, a second resource from the sidelink resource pool for the first sidelink transmission; and
    determining, based on a configuration, to utilize the filtered virtual collision metric for the congestion control.

16. The method of claim 15, wherein the configuration includes an indication indicating whether utilizing the filtered virtual collision metric for the congestion control is allowed.

17. The method of claim 15, wherein the configuration includes an indication indicating that utilizing the filtered virtual collision metric for the congestion control is allowed based on at least one of a capability of the UE, a zone associated with the UE, a time period associated with the congestion control, or a detection of a radio access technology (RAT) different from a RAT of the UE.

18. The method of claim 1, further comprising:
    transmitting, to a base station (BS), a report indicating the filtered virtual collision metric.

19. The method of claim 18, wherein the transmitting the report for the filtered virtual collision metric is further based on a reporting periodicity.

20. The method of claim 18, wherein the transmitting the report for the filtered virtual collision metric is further based on a reporting trigger.

21. A method of wireless communication performed by a user equipment (UE), the method comprising:
    selecting a plurality of measurement-only resources from a sidelink resource pool based on a first measurement of an availability of resources within the sidelink resource pool at a first time;
    performing a second measurement of an availability of the selected plurality of measurement-only resources at a second time after the first time;
    storing a first virtual collision indication in a virtual collision log based on the second measurement, the virtual collision log including a plurality of virtual collision indications;
    applying, based on a time window, a filter to the virtual collision log to provide a filtered virtual collision metric; and
    transmitting, based on the filtered virtual collision metric:
        a first sidelink transmission using different resources than the selected plurality of measurement-only resources, and
        a transmission parameter.

22. The method of claim 21, wherein the first measurement is performed based on a measurement-only sensing configuration.

23. The method of claim 22, wherein the measurement-only sensing configuration includes an indication of a periodicity, and wherein the selecting the plurality of measurement-only resources is further based on the periodicity.

24. The method of claim 22, wherein the measurement-only sensing configuration includes an indication of an event associated with at least one of a geographical zone, a missed packet delay budget, or a virtual collision metric threshold, and wherein the selecting the plurality of measurement-only resources is further based on a detection of the event.

25. A user equipment (UE) comprising:
    one or more transceivers;
    one or more memories; and
    one or more processors coupled to the one or more transceivers and one or more memories, the one or more memories storing instructions that are executable by the one or more processors, individually or in any combination, to cause the UE to:
        select a plurality of resources from a sidelink resource pool based on a first measurement of an availability of resources within the sidelink resource pool at a first time;
        perform a second measurement of an availability of the selected plurality of resources at a second time after the first time;
        store a first virtual collision indication in a virtual collision log based on the second measurement, the virtual collision log including a plurality of virtual collision indications;
        apply, based on a time window, a filter to the virtual collision log to provide a filtered virtual collision metric; and
        transmit, based on the filtered virtual collision metric:
            a first sidelink transmission using different resources than the selected plurality of resources, and
            a transmission parameter.

26. A user equipment (UE) comprising:
    one or more transceivers;
    one or more memories; and
    one or more processors coupled to the one or more transceivers and one or more memories, the one or more memories storing instructions that are executable by the one or more processors, individually or in any combination, to cause the UE to:
        select a plurality of measurement-only resources from a sidelink resource pool based on a first measurement of an availability of resources within the sidelink resource pool at a first time; and
        perform a second measurement of an availability of the selected plurality of measurement-only resources at a second time after the first time;
        storing a first virtual collision indication in a virtual collision log based on the second measurement, the virtual collision log including a plurality of virtual collision indications;
        applying, based on a time window, a filter to the virtual collision log to provide a filtered virtual collision metric; and
        transmit, based on the filtered virtual collision metric:
            a first sidelink transmission using different resources than the selected plurality of measurement-only resources, and
            a transmission parameter.

27. The method of claim 21 wherein the applying the filter to the virtual collision log comprises:
    determining a quantity of virtual collision occurrences within the time window.

28. The method of claim 21, wherein the selecting the plurality of measurement-only resources comprises selecting a first resource of the plurality of measurement-only resources based on a resource selection trigger, further comprising:
- selecting a second resource, the second resource being a transmission resource to be used for the first sidelink transmission.

29. The method of claim 28, further comprising:
- transmitting, at a first time instant, a first evaluation request for the first resource; and
- transmitting, at a second time instant different from the first time instant, a second evaluation request for the second resource.

30. The method of claim 21, wherein the transmitting the first sidelink transmission comprises:
- transmitting the first sidelink transmission based on the filtered virtual collision metric satisfying a threshold.

* * * * *